Nov. 2, 1965  A. O. FITZNER  3,215,915
PHASE SENSITIVE SERVO CONTROL SYSTEM
Filed June 4, 1962  6 Sheets-Sheet 3
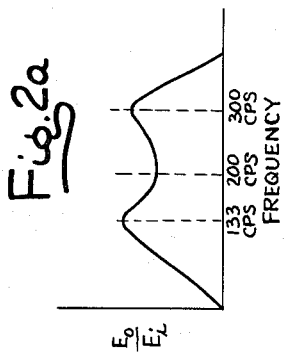
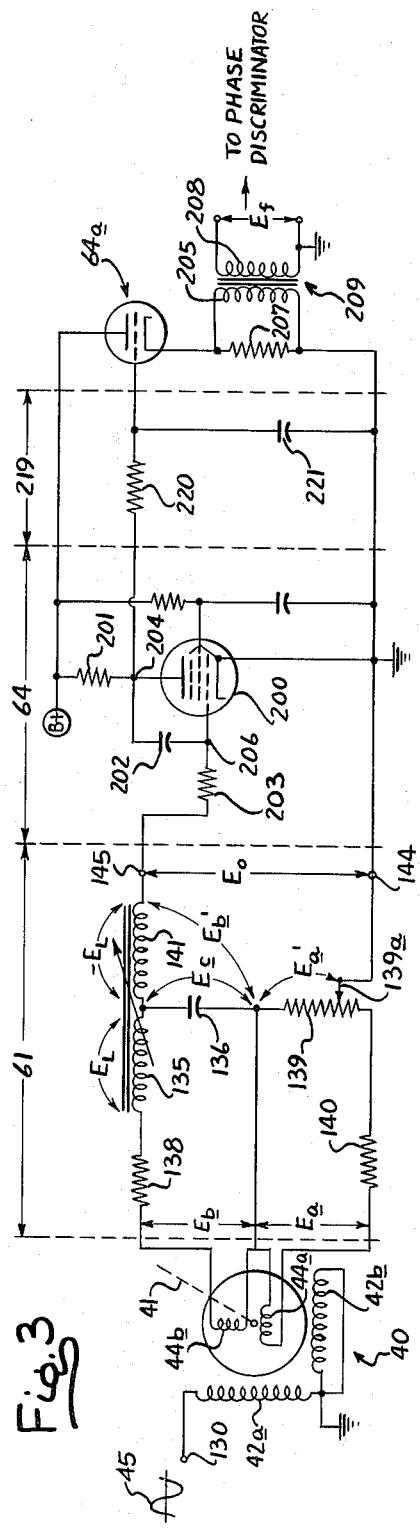
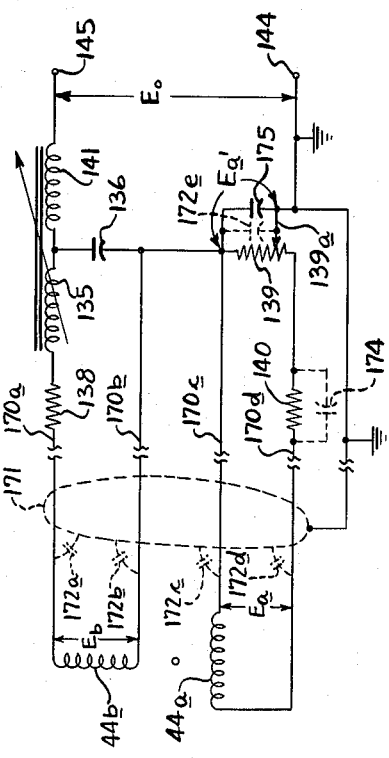
INVENTOR.
ARTHUR O. FITZNER
BY
Wolfe, Hubbard, Voit & Osann
ATTYS.

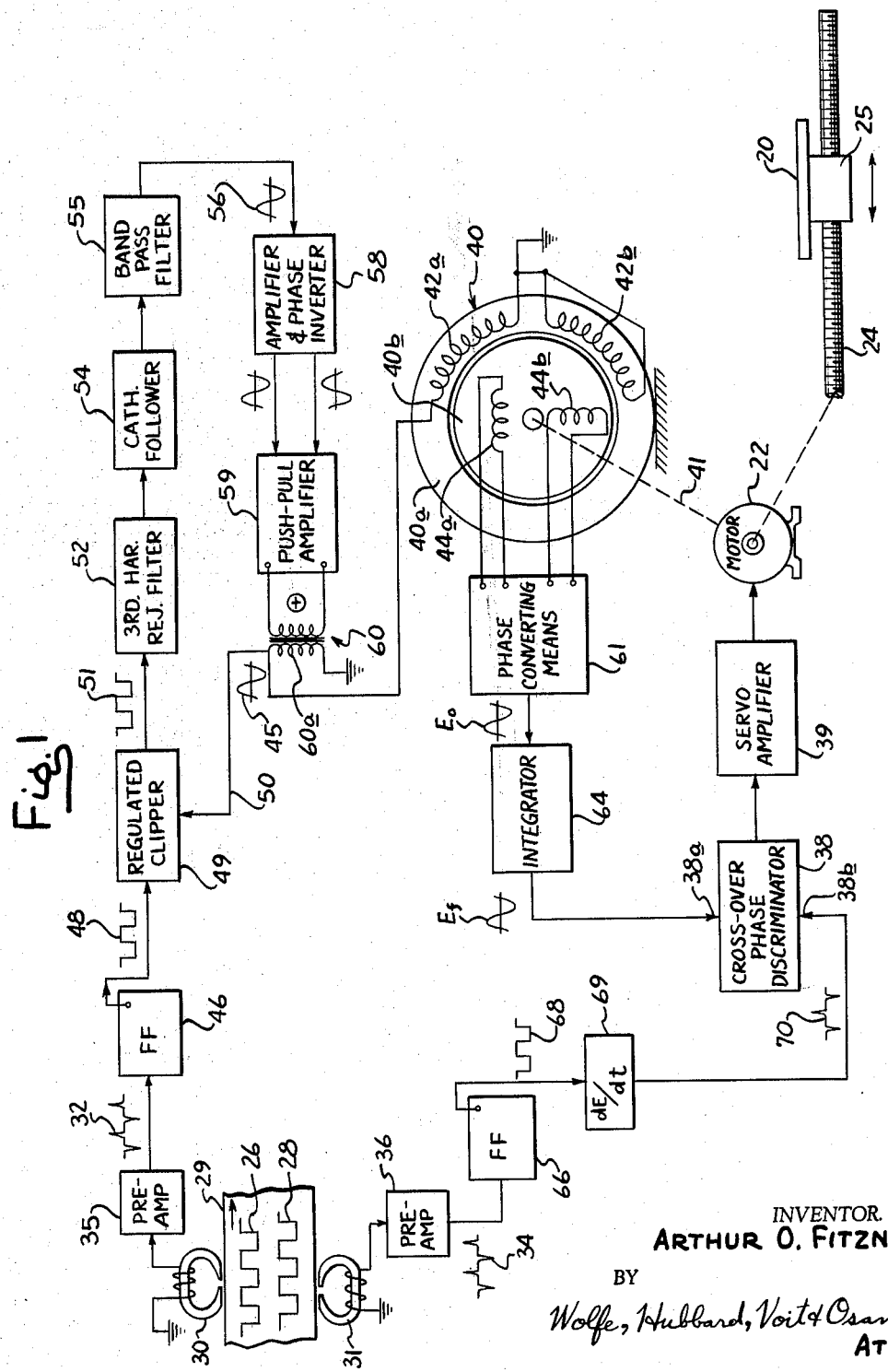

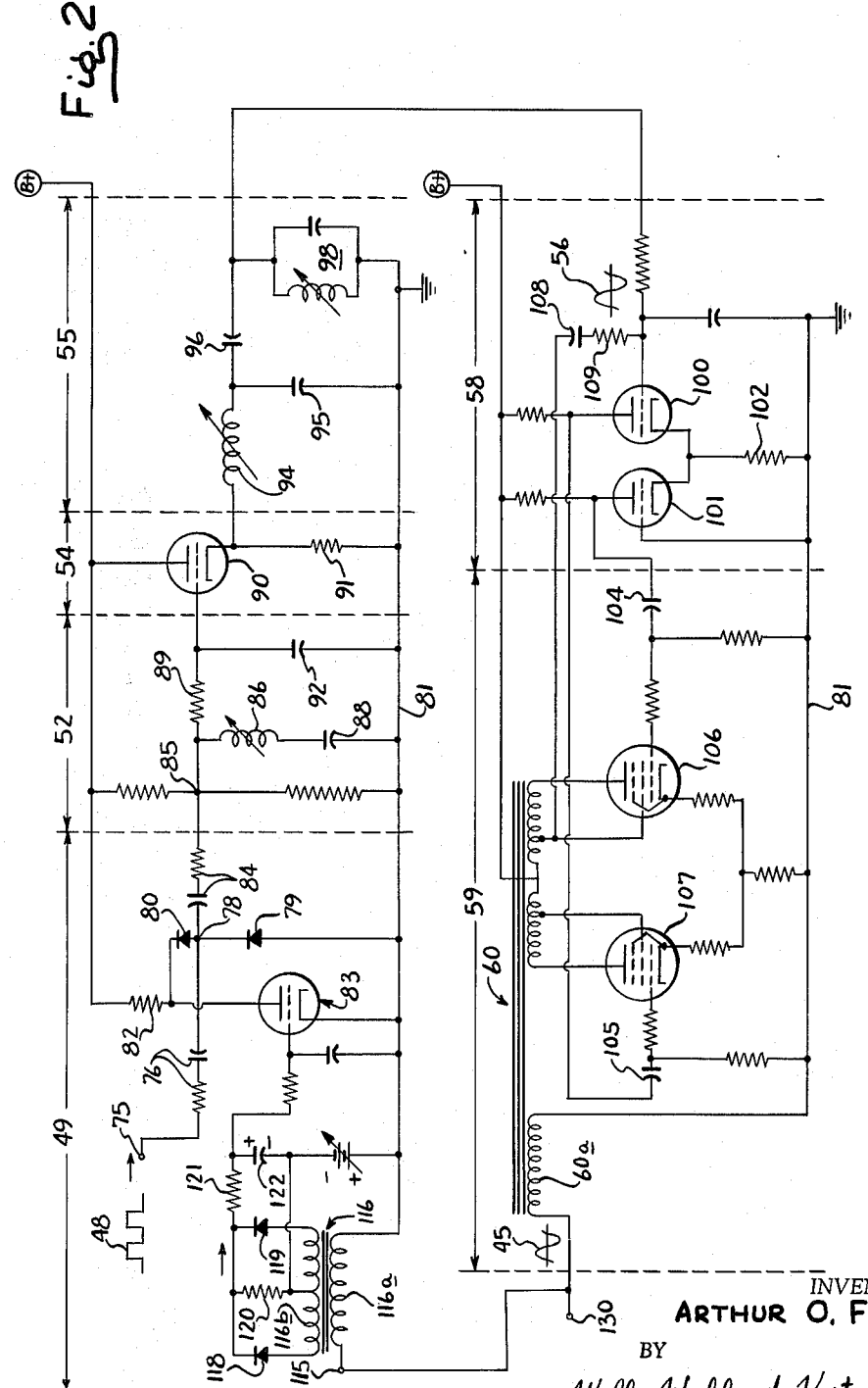

Nov. 2, 1965 — A. O. FITZNER — 3,215,915
PHASE SENSITIVE SERVO CONTROL SYSTEM
Filed June 4, 1962 — 6 Sheets-Sheet 4
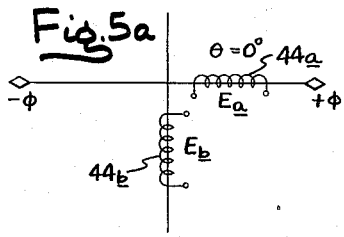
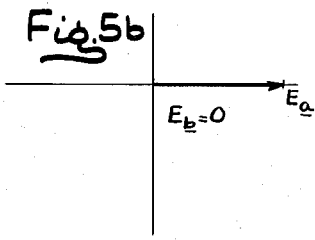
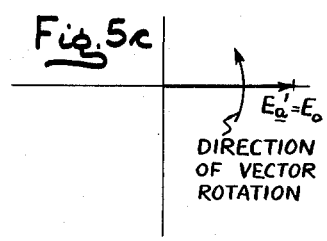
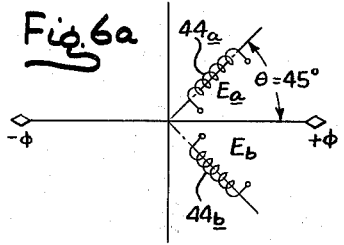
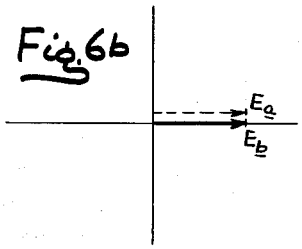
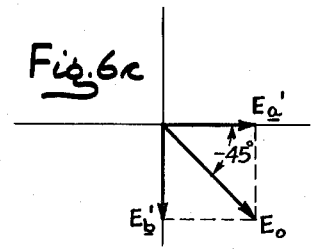
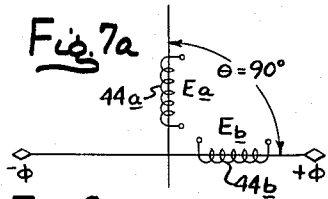
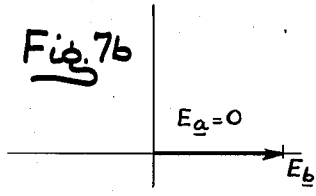
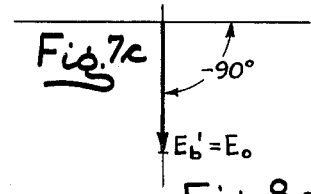
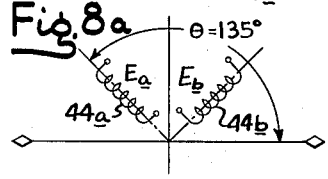
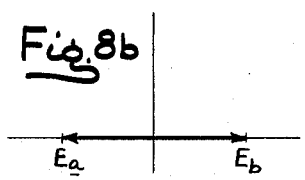
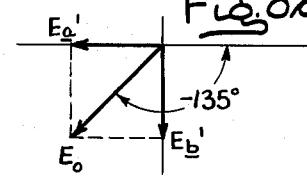
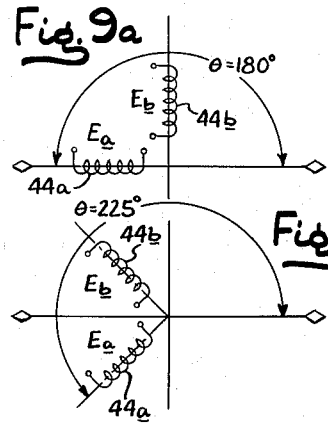
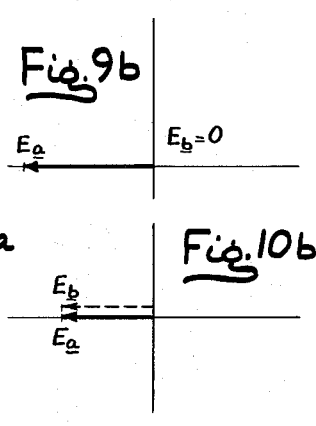
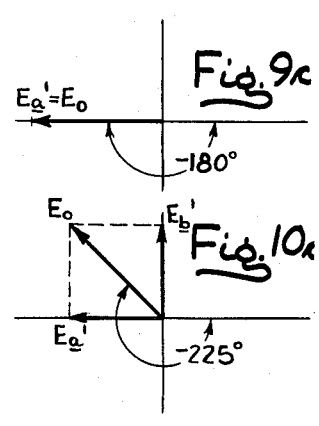
INVENTOR.
ARTHUR O. FITZNER
BY
Wolfe, Hubbard, Voit & Osann
ATTYS.

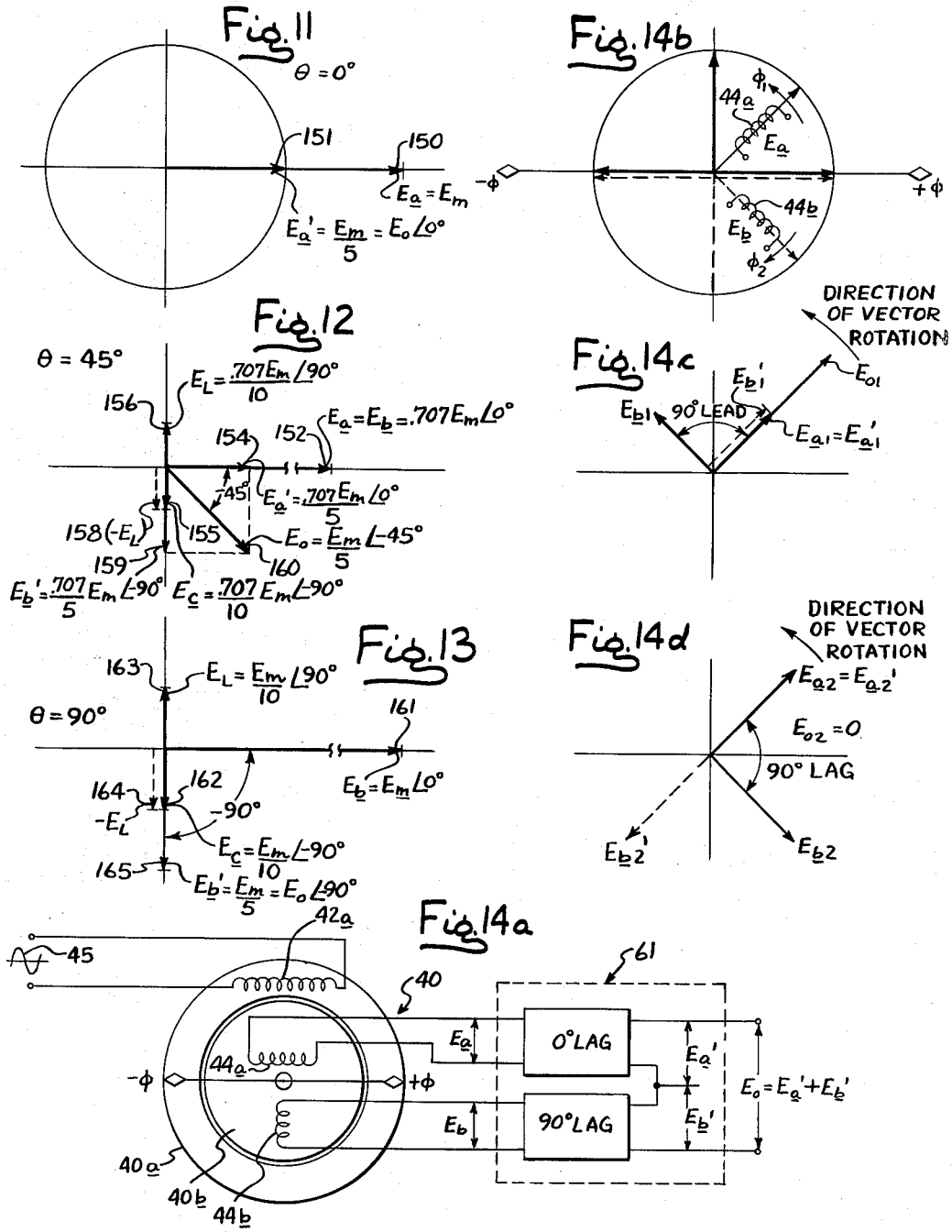

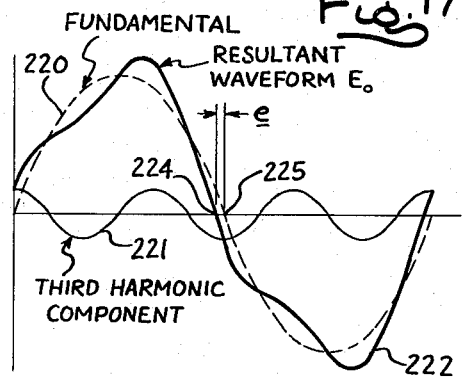
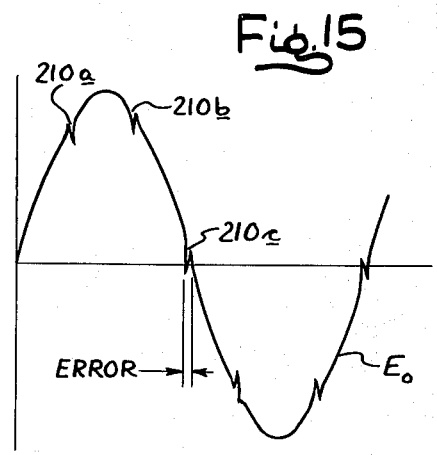
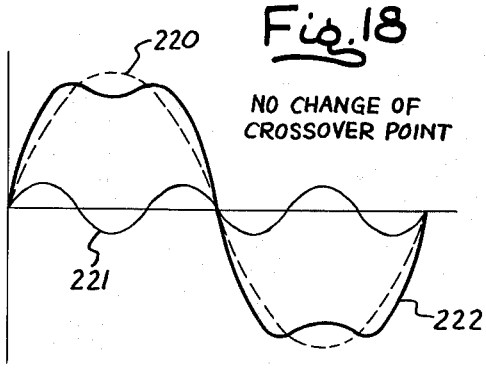
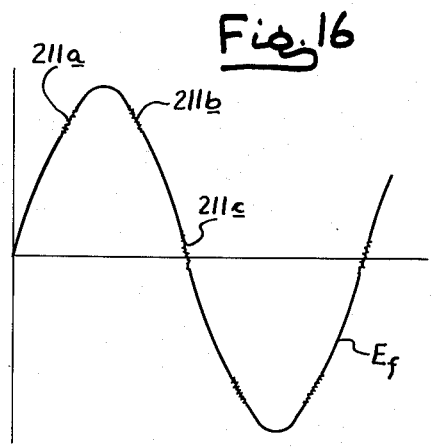
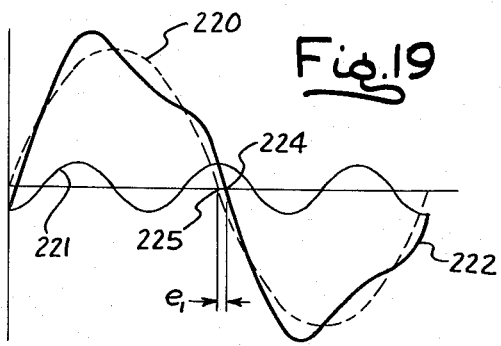

United States Patent Office 3,215,915
Patented Nov. 2, 1965

3,215,915
PHASE-SENSITIVE SERVO CONTROL SYSTEM
Arthur O. Fitzner, Fond du Lac, Wis., assignor to Giddings & Lewis Machine Tool Company, Fond du Lac, Wis., a corporation of Wisconsin
Filed June 4, 1962, Ser. No. 199,915
15 Claims. (Cl. 318—28)

The present invention pertains in general to phase control systems, and in particular to systems in which the relative displacement of two movable parts of a synchronous induction device is caused to produce a corresponding shift in phase between a recurring reference wave and a recurring output wave. While not so limited in its application, the invention finds especially advantageous use in phase-sensitive servo controls, employed for example in automatic machine tool positioning and contouring apparatus, wherein a movable member is caused to follow in position and velocity the extent and the rate of change of phase displacement between two recurring waves.

It is the general aim of the invention to provide an improved phase control system of the type generally designated above, and characterized particularly by increased accuracy of the correlation between the phase shift of the final output wave and the displacement between the relatively movable parts of a synchronous induction device.

An important object of the invention is to provide such a phase control system in which the induction device is excited by a single phase alternating voltage derived from the recurring reference wave, thereby making possible more precise excitation; and yet further to convert inphase, variable-amplitude signals induced in the output windings of the induction device into a single alternating signal which remains substantially constant in amplitude, and shifts accurately in phase according to the positions of the two relatively movable parts of the induction device, despite minor changes in the frequency and amplitude of the recurring reference wave.

A related object is to provide a novel and improved arrangement for converting a recurring reference wave of square waveform into a substantially pure sinusoidal waveform, with the latter having a substantially constant phase angle relative to the former and being of substantially constant amplitude for exciting a synchronous induction device, and despite minor variations in the frequency or amplitude of the reference wave.

It is another object to provide an improved phase converting circuit for converting the output of single phase excited synchronous induction device into a constant amplitude, variable phase alternating voltage which may serve as an accurate input to a phase discriminator.

In this connection, it is an object to provide for the shielding of long conductors leading from the output terminals of a synchronous induction device to an associated phase-combining device, thereby to prevent pick-up of spurious noise, and at the same time to obviate phase shift errors which would otherwise result from stray capacitance between such conductors and shielding.

Still another object of the invention is to produce a recurring output wave from a synchronous induction device which is phase-shifted from an exciting voltage according to the relative positions of the two movable parts of the device, and yet which does not change appreciably in amplitude as the speed of the relative movement of such parts varies appreciably. Such an amplitude-insensitive output wave when applied to a phase-discriminator permits the latter to produce a D.C. voltage which more accurately represents the difference in phase between its two inputs.

A related object is to produce such a recurring output wave derived from a synchronous induction device which contains markedly reduced distortions from the intended sinusoidal waveform, and which would otherwise result, for example, from spurious harmonics, "brush bounce," or non-uniform permeability of the flux path in the induction device. The elimination of such distortions in the final output wave further increases the operational accuracy of a phase discriminator which receives that wave as one of its inputs.

In this connection, it is a coordinate object to derive an output signal from a synchronous induction device which, in effect, is instantaneously related to the flux linkage of a rotating magnetic field with an output winding, rather than instantaneously related to the rate of change of such flux linkage.

Other objects and advantages will become apparent as the following description proceeds, taken in conjunction with the accompanying drawings, in which:

FIGURE 1 is a diagrammatic block-and-line illustration of a phase-sensitive servo system embodying the features of the present invention;

FIGS. 2 and 3 are schematic circuit diagrams for portions of the system shown in FIG. 1;

FIG. 2a is a graph illustrating the band pass characteristic of a filter shown in FIG. 2;

FIG. 4 is a schematic diagram corresponding to a portion of FIG. 3 and illustrating a modification which prevents spurious phase shifts due to stray capacitance;

FIGS. 5a, b, c through FIGS. 10a, b, c are vector diagrams illustrating the general operation of the synchronous resolver and phase converting means of FIG. 3 when the resolver rotor occupies different physical angles;

FIGS. 11, 12 and 13 are more complete vector diagrams illustrating the various alternating voltages existing in the phase converting means of FIG. 3 when the resolver rotor occupies three respective physical angles;

FIGS. 14a, b, c, and d illustrate by schematic and vector diagrams the effective operation of the synchronous resolver and phase combining circuit in producing an output voltage proportional to a rate of change of flux linkage with a rotating magnetic field;

FIGS. 15 and 16 illustrate the presence of spurious noise or distortions which may exist in the output voltage derived from a synchronous induction device, and the advantageous effect of an integrator in removing such noise or distortions; and FIGS. 17, 18 and 19 illustrate the manner in which a resolver output voltage may be distorted by the presence of undesired harmonics, such figures aiding in an understanding of the purpose and operation of an integrator employed as a part of the present apparatus.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

*The phase servo system in general*

Referring now to FIG. 1, the servo system there diagrammatically illustrated is of the general type employed in certain automatic machine tool control systems, for example, systems of the type shown and described in the copending application of McDonough et al., Serial No. 271,558 filed April 5, 1963, a continuation application, and assigned to the assignee of the present application. To describe this exemplary background environment briefly, a movable machine tool element 20 such as a tool-carrying ram or saddle, is automatically moved through predetermined distances and at selected velocities by appropriate energization of a servo motor 22 connected to turn a lead screw 24 having a nut 25 engaged therewith and connected to the element 20. The motor 22 is energized so that the element 20 is moved through distances, directions, and at speeds corresponding to the extent, sense, and rate of change of two relatively phase modulated signals recorded as a reference trace 26 and a control trace 28 on a magnetic tape 29. As shown in FIG. 1, the magnetic flux traces recorded on the tape 29 have a square waveform, having been produced by square wave voltages, which shift in phase relative to one another, applied to recording heads at the time that the signals are recorded on the magnetic tape. Upon playback, the magnetic tape 29 is traversed past a reference playback head 30 and a control playback head 31 so that the magnetic traces induce therein alternate positive and negative going pulses illustrated at 32 and 34. These two pulse trains are preferably first passed through preamplifiers 35 and 36, each pulse corresponding to a negative or a positive going transition in the associated flux trace on the magnetic tape 29. Because the magnetic tape is traversed during playback at a speed corresponding to the speed with which it was moved during recording, the pulse waveforms 32 and 34 represent reference and control signals, with the latter shifting in phase relative to the former according to the extent, sense, and velocity of motion to be imparted to the movable element 20.

In order to ascertain by feedback that the movable element 20 has moved in agreement with the relative phase modulation of the pulse trains 32 and 34, the reference pulse train 32 is converted into a corresponding alternating voltage and then shifted in phase by an amount which corresponds to the movement or displacement of the element 20. This phase shifted wave is then compared with the control wave 34 by means of a phase discriminator 38, and any disagreement in the phase of these two waves is amplified by a servo amplifier 39 which controls the energization of the motor 22. When the two inputs to the phase discriminator 38 are exactly in phase, the output of the phase discriminator is reduced to zero, and the motor 22 is de-energized so that the element 20 comes to rest.

To produce a shift in phase according to a variable physical quantity, i.e., the displacement of a movable element 20, a synchronous induction device having two relatively movable parts is employed. A variety of synchronous induction devices are well known, and may for example take the form of "Selsyn" transmitters, synchronous resolvers, or "Inductosyn" scales. Although synchronous induction devices having relatively rotatable stators and rotors are more common in the art, it will be understood that such devices may also take the form of two elongated members inductively coupled to produce varying voltages in output windings as the two movable parts are linearly shifted. In any event, the synchronous induction device is excited with one or more sinusoidal voltages, and has inductively coupled output windings or conductors which produce output voltages varying in phase or amplitude as a function of the relative positions of two movable parts.

For purposes of illustration, the synchronous induction device is here shown as a resolver 40 having a stator 40a and a rotor 40b, the rotor being mechanically connected by a suitable coupling 41 to the motor 22 and the element 20. As a specific example, the resolver rotor 40b may be mechanically coupled (by gearing, not shown) to the motor 22 such that it rotates one revolution for each 0.1 inch that the movable element 20 travels. The resolver 40 includes two stator windings 42a, 42b and two rotor windings 44a, 44b. The respective pairs of stator and rotor windings are physically separated by 90°, as is well known. While it would be possible to apply two sinusoidal A.C. voltages separated 90° in phase to the respective stator windings 42a, 42b and thus create a rotating magnetic field of substantially constant amplitude within the resolver 40, this method of exciting the resolver leads to inconvenience and inaccuracy because the two excitation voltages for the two stator windings would both have to be accurately related in phase to the reference pulse train 32, substantially equal in amplitude, and separated by exactly 90° in phase.

In accordance with one aspect of the present invention, a single phase alternating sinusoidal voltage 45 is generated from the reference pulses 32, made to have a substantially fixed phase angle relation to the reference pulses 32, and used to excite the resolver 40 so that the latter contains a bi-directional pulsating magnetic field as will be more fully explained below. It will suffice to note at this point that the sinusoidal voltage wave 45 is caused to have a fixed phase relation to the reference pulses 32, and a substantially constant amplitude so that the resolver 40 is excited with a magnetic field which represents the phase of the reference pulses 32. As here shown, the derived excitation voltage 45 is applied only to the stator winding 42a, while the stator winding 42b is shorted out and not used.

For the purpose of generating the excitation voltage 45 while assuring that it has a substantially pure sinusoidal waveform and is precisely matched in phase to the reference pulses 32, the latter pulses are first applied to a flip flop circuit 46 which is triggered or switched in state in response to each input pulse. Thus, the reference pulse train 32 is converted into a corresponding square wave 48 having a frequency and phase identical to those of the pulses 32. To assure that the sinusoidal excitation voltage 45 remains substantially constant in amplitude despite drifting of amplifier characteristics or supply voltages, the square wave 48 is passed to a regulated clipper 49 which is controlled in part by a feedback connection 50. The output of the clipper 49 is a second square wave 51 of regulated amplitude and matched in phase and frequency to the reference pulses 32. This second square wave 51 is then passed through a third harmonic rejection filter 52 as a first step in converting it to a sinusoidal waveform. The output of the filter 52 is transferred through a cathode follower 54 for purposes of impedance transformation and thence supplied to a band pass filter 55 having the center frequency of its pass band equal to the frequency of the reference pulses 32. The output of the band pass filter 55 is a substantially pure sinusoidal waveform 56, and the latter is amplified and split in phase by an amplifier and phase inverter 58. The two outputs of opposite phase from the phase inverter 58 are then supplied as input signals to a push-pull amplifier 59 having an output transformer 60, so that the excitation voltage 45 is induced in the secondary winding 60a of that transformer.

With the excitation voltage 45 applied to the single stator winding 42a of the resolver 40, the alternating voltages induced in the two rotor windings 44a, 44b, vary in amplitude according to the angular position of the rotor 40b relative to the stator 40a. These two resolver output voltages are, moreover, always in phase with or out of phase with the excitation voltage, depending upon the angular quadrant which the rotor occupies. As will be noted more fully below, it may be said that the output voltages induced in the rotor windings 44a and 44b are proportional in amplitude to $\cos \theta$ and $\sin \theta$, where $\theta$ is the angle of the rotor 40b relative to a reference position; and such voltages are of a phase polarity corresponding to the sign of $\cos \theta$ and $\sin \theta$, respectively.

Since these two voltages have no direct phase variation, they are applied to a phase converting means 61 (to be more fully described) which changes them into a single sinusoidal output voltage $E_o$ of substantially constant amplitude and which is shifted in phase relative to the excitation voltage 45 by an angle which corresponds to the angular position of the rotor 40b relative to the stator 40a. This phase-varying, alternating voltage $E_o$ is then passed through an integrator 64 (to be more fully described), and then to one input 38a of the phase discriminator 38. Thus, the phase separation between the output voltage E$f$ of the integrator 64 and the reference pulse train 32 represents the actual distance or displacement of the movable member 20 from a certain reference position, since the angular displacement of the rotor 40$b$ is related to the displacement of the element 20, and since the phase shift produced by the resolver 40 between the excitation voltage 45 and the final output voltage E$f$ is proportional to the angular position of the rotor 40$b$.

The control pulse train 34 generated in the playback head 31 from the control trace 28 on the magnetic tape 29 is applied from the preamplifier 36 to the input of a flip flop 66 which, in turn, produces a corresponding square wave voltage 68. This latter voltage is passed through a differentiating circuit 69 which reconverts the square wave 68 into an amplified pulse train 70, the latter being applied as the input to the second terminal 38$b$ of the phase discriminator 38. When the phase shift produced by the feedback resolver 40 equals the phase separation between the reference pulses 32 and the control pulses 34, the two inputs to the discriminator 38 are matched precisely in phase, and the output of the discriminator goes to zero. So long as there is any phase difference between the two inputs applied to the discriminator 38, indicating that the actual position of the element 20 differs from the desired position represented by the phase separation of the reference and control pulses 32 and 34, the output of the phase discriminator will be a voltage having a magnitude and polarity which causes the servo amplifier 39 to energize the motor 22 so that the latter drives the element 20 toward the desired position. Although a variety of suitable phase discriminators are well known to those skilled in the art, it may be noted that one such discriminator is fully shown and described in the copending application of Henry P. Kilroy et al., Serial No. 7,707, filed February 9, 1960 (now issued as U.S. Patent 3,175,138) and assigned to the assignee of the present application.

While it is intended that the reference and control pulse trains 32 may continuously shift in phase over a large angle considerably more than 360°, so that the motor 22 may drive the element 20 through a large distance and thereby cause the feedback resolver rotor to turn through many revolutions, the entire servo system is arranged such that the element 20 follows with only slight dynamic errors the changes in phase of the control pulses 34. The maximum phase separation between the two inputs to the phase discriminator 38 does not exceed 180°. In other words, while the reference pulses and the control pulses 34 constitute a cyclically varying phase signal, and the resolver 40 produces a cyclically varying phase feedback signal, the limits of one cycle of phase variation are never exceeded, and wide changes in the position of the element 20 can be accurately produced.

*The resolver excitation circuits*

With the foregoing general organization of the servo control system in mind, the more detailed organization and operation of the apparatus for deriving the resolver excitation voltage 45 will be described with reference to FIG. 2. The flip-flop 46 illustrated in FIG. 1 is well known to those skilled in the art and is thus not illustrated in detail in FIG. 2. The square wave voltage 48 from the flip flop 46 is applied to an input terminal 75 (FIG. 2) forming a part of the regulated clipper 49, and for purposes of discussion it will be assumed that the frequency of the square wave 48 is 200 c.p.s. That square wave is passed through a resistance-capacitance coupling connection 76 to the junction 78 between two uni-directionally conductive devices or diodes 79 and 80. The diode 79 has its anode connected to a point of reference or ground potential represented by the conductor 81 and its cathode connected to the junction 78. The diode 80 is connected with like polarity between the junction 78 and the lower end of a plate load resistor 82 associated with a regulating triode 83. The diode 79 assures that the square wave voltage appearing at the junction 78 can never swing more negative than ground potential, while the diode 80 assures that the junction 78 can never swing more positive than the potential appearing at the lower end of the resistor 82. This latter potential, determined by the current flow through the triode 83, is automatically regulated by a feedback connection which will be more fully described below. For the present, it will suffice to indicate that a square wave voltage of clipped, regulated amplitude is passed from the junction 78 through an R-C coupling circuit 84 to the input terminal 85 of the third harmonic filter 52.

As illustrated in FIG. 2, this third harmonic rejection filter 52 is formed by a series resonant circuit comprising an inductance 86 and a capacitor 88 connected to a point of ground potential. Assuming that the reference pulse train 32 (FIG. 1) and the square wave voltage 48 have a frequency of 200 c.p.s., the inductance 86 and capacitance 88 are turned to be series resonant at the third harmonic frequency, i.e., 600 c.p.s. This means that the third harmonic component of the square wave voltage applied to the terminal 85, and which constitutes the principal harmonic which gives the latter its square waveform, is almost totally shunted or shorted to ground by the series resonant circuit 86, 88. The fundamental 200 c.p.s. sinusoidal component of the square wave voltage is passed from the junction 85 through a coupling resistor 89 to the control grid of a triode 90 having a cathode resistor 91 and constituting the impedance-transforming cathode follower 54. The resistance 89 in combination with a grid-capacitor 92 constitutes an R-C filter which attenuates higher order harmonics of the 200 c.p.s. fundamental.

The output of the cathode follower 54 is then supplied to the band pass filter 55 which includes an inductance 94 and a capacitor 95 connected across the cathode resistor 91. Because the effective value of the resistance 91 is relatively small, the inductance 94 and capacitance 95 constitute, in effect, a parallel tuned circuit resonant at a frequency of approximately 285 c.p.s. The output from this circuit is supplied through a coupling capacitor 96 across a second parallel tuned circuit 98 which is tuned to a frequency of approximately 285 c.p.s. Due to the coupling effect of one tuned circuit upon the other, the band pass characteristic of the filter 55 thus has a shape similar to that illustrated in FIG. 2$a$, and serves to attenuate all sinusoidal components of the signal received from the cathode follower 54 above and below frequencies of 133 and 300 c.p.s. This band pass characteristic is chosen in order to accommodate slight variations in the frequency of the reference pulses 32 (FIG. 1) derived from the magnetic tape 29 and to reduce phase shifts which might be introduced by the filter 55. In its main effect, however, the filter 55 severely attenuates higher and lower order harmonics of the fundamental frequency, and passes only a substantially pure sinusoidal signal 56 having the same frequency as, and fixed phase relative to, the square wave 48.

In order to amplify the sinusoidal voltage 56, the latter is applied to the grid of a triode 100 which, together with a triode 101, constitutes the phase inverter and amplifier 58. It will be seen that the grid of the triode 101 is connected directly to the ground conductor 81, so that the input signal to the latter amplifying tube is formed by the common cathode resistor 102 for the triodes 100, 101. The two voltages appearing at the anodes of the triodes 100, 101 thus are two alternating sinusoidal voltages separated 180° in phase, and these signals are connected through coupling capacitors 104 and 105 to the control grids of pentodes 106 and 107 which, together with the transformer 60, constitute the push-pull amplifier 59. A negative feedback path is formed by a capacitance 108 and a resistor 109 connected in series from the output of the pentode 106 to the grid of the triode 100. The capacitor 108 more readily transfers higher frequency signals, and thus the negative feedback action is greater for any high frequency distortion components (e.g., third or fifth harmonics) which may appear in the output of the push-pull amplifier 59. This negative feedback path thus further serves to assure that the final excitation voltage 45 is a substantially pure sinusoidal wave at a frequency matched to that of the reference pulse 32 and at a fixed phase angle relative thereto.

As mentioned previously, the amplitude of the excitation voltage 45 produced in the secondary winding 60a of the transformer 60 is regulated to a high degree by virtue of a feedback connection 50 (FIG. 1) to the clipper 49. As here shown, a terminal 115 for the secondary winding 60a is connected directly to the primary winding 116a of a transformer 116 having a center-tapped secondary winding 116b. The voltage induced in the secondary winding 116b is subjected to full wave rectification by diodes 118, 119 and thus appears as a pulsating direct voltage across a resistor 120. This pulsating direct voltage is smoothed by an R-C filter 121, 122 and the D.-C. voltage appearing across the capacitor 122 therefore varies directly with changes in the amplitude of the sinusoidal excitation voltage 45. The capacitor 122 is connected in series with a variable negative biasing source, here shown as a battery 124, to form the input signal applied to the control grid of the regulating triode 83.

When the excitation voltage 45 increases in amplitude, the potential of the grid of the triode 83 is made more positive, and the voltage at the lower end of the resistor 82 is decreased or made more negative. This means that the diode 80 clips the square wave voltage appearing at the junction 78 at a lower voltage level and reduces the amplitude of the square wave passed to the input of the filter 52. Conversely, if the amplitude of the excitation voltage 45 decreases, the potential across the capacitor 122 decreases and the triode 83 becomes less conductive, so that the potential at the lower end of the load resistor 82 becomes more positive. This results in the diode 80 clipping the positive swings of the square waveform applied to the junction 48 at a higher level, and increases the amplitude of the square wave voltage applied to the input of the filter 52. In this manner, the amplitude of the sinusoidal excitation voltage produced at the output of the amplifier 59 is maintained substantially constant.

*The resolver and phase converting circuit*

To excite the feedback resolver 40, the output terminal 130 of the amplifier 59 is connected to the stator winding 42a (FIG. 3). As previously noted, the stator winding 42b is shorted and has no operational effect. The voltages Ea and Eb induced in the two rotor windings 44a, 44b, therefore, are proportional in amplitude in the cosine and sine of the angle which the rotor 44b occupies relative to the pulsating magnetic field produced in the resolver. Neither of these voltages Ea, Eb is related in its phase to the angular position of the rotor 40b, and thus neither is useful as an input signal to the phase discriminator 38 (FIG. 1). It is necessary and desirable to produce a single alternating output voltage which is substantially constant in amplitude, and which shifts in phase relative to the excitation voltage 45 according to the angular position of the resolver rotor 40b. This conversion is effected here by the novel phase converting means 61 which receives as its inputs the two voltages Ea and Eb induced in the respective rotor windings 44a and 44b.

In order to better understand the nature of the voltages Ea, Eb induced in the rotor windings 44a, 44b, reference should be had to FIGS. 5a through 10a and FIGS. 5b through 10b. Let it be assumed that the single phase alternating excitation voltage 45 applied to the stator winding 42a (FIG. 3) produces a bi-directional sinusoidally pulsating flux in the resolver rotor, such flux being represented by the vector $+\phi$, $-\phi$ along the horizontal axis in FIG. 5a. As noted previously the rotor windings 44a, 44b are physically separated by an angle of 90°, and it will be assumed that the rotor occupies a reference position, i.e., its angular displacement $\theta$ is zero, when the winding 44a is alined with the flux vector $\phi$.

FIG. 5a, therefore, illustrates the physical relationships between the flux vector $\phi$ and the rotor windings 44a, 44b when the rotor angle $\theta$ is equal to zero. Under these conditions, the sinusoidal voltage Ea induced in the winding 44a will have its maximum amplitude Em because all the turns of the winding 44a will be cut by the pulsating magnetic field. The voltage Eb induced in the winding 44b will have a zero amplitude because the winding 44b is in space quadrature relation to the flux vector $\phi$ and none of its turns are cut by the pulsating magnetic flux. Thus, as indicated in FIG. 5b, the voltage Ea is vectorially represented by a vector extending to the right, i.e., at a zero or reference phase position. The voltage Eb, being equal to zero, does not appear as any vector representation in FIG. 5b.

If now the rotor 40b is turned counterclockwise through 45° so that the rotor windings occupy the physical positions illustrated in FIG. 6a, the voltage Ea will gradually decrease in amplitude, and the voltage Eb will gradually increase in amplitude. When $\theta$ is equal to 45° (FIG. 6a), the voltage Ea will be proportional in amplitude to cos 45°, i.e., 0.707 times its maximum amplitude Em. The voltage Eb will have an amplitude proportional to sin $\theta$, i.e., 0.707 times its maximum amplitude Em. Both of the voltages Ea and Eb will have a frequency equal to the pulsating magnetic field $\phi$, and both will be in phase and lying at a zero degree phase position, as shown in FIG. 6b.

When the rotor is turned further to a position at which $\theta$ equals 90° (FIG. 7a), the voltage Ea will be reduced to zero amplitude, while the voltage Eb will be increased to its maximum amplitude Em. That is, Ea is equal to (cos 90° $\times$ Em) or zero; and Eb is equal to (sin 90° Em) or Em. This is vectorially represented in FIG. 7b.

When the rotor is turned to the position at which $\theta$ equals 135° (FIG. 8a), the voltage Eb is again reduced in amplitude, but remains at a reference or zero phase position (FIG. 8b), while the voltage Ea now has the same amplitude, and is of opposite phase, as represented by the vector Ea in FIG. 8b When the rotor is turned to a position at which $\theta$ equals 180°, the amplitude of the voltage Eb is reduced to zero, while the amplitude of the voltage Ea has its maximum value. The latter has a negative phase polarity, i.e., it is 180° displaced from the zero phase position, as shown in FIG. 9b.

Finally, when the rotor is turned to an angle $\theta$ of 225° (FIG. 10a), the voltages Ea and Eb are both in amplitude equal to .707 times their maximum amplitude Em, and both are of negative phase polarity, as represented by the two vectors in FIG. 10b.

It will thus be apparent that the two voltages Ea and Eb induced in the resolver output windings 44a and 44b are both sinusoidal voltages having a frequency equal to the excitation voltage 45, and that they respectively vary in amplitude in proportion to the values of Em cos $\theta$ and Em sin $\theta$, where $\theta$ is the angular position of the rotor relative to the stator. The voltages Ea and Eb are "phase polarized," i.e., always of one phase angle (0°), or of the opposite angle (180°), so that it may be said that the "phase polarities" of the two voltages agree with the signs of cos $\theta$ and sin $\theta$ respectively.

In order to convert these voltages into a variable phase signal whose phase angle is, relative to a given reference, equal to the rotor angle $\theta$, the phase converting circuit 61 (FIG. 3) is employed.

In accordance with one feature of the present invention, one of the two voltages Ea, Eb (here Eb) is applied to series resonant means in order to derive a first alternating signal (here labeled Eb') which is shifted 90° in phase from, and is proportional in amplitude to, that voltage. The other of the two voltages Ea, Eb (here Ea) is used to energize means to produce a second signal (here labeled Ea') in phase therewith and proportional in amplitude thereto. The gains or attenuation factors of the two signal-deriving means are made equal. These two signals are then vectorially added together to produce an output voltage Eo.

The circuit arrangement for accomplishing the foregoing is shown in FIG. 3 and will be described in greater detail. First, the rotor voltage Eb is applied across a series resonant circuit formed by two reactive elements, here shown as an inductance 135 and a capacitance 136. A resistor 138 of relatively high ohmic value is included in the series resonant circuit to render negligible the presence of, and any variations in, resistive components of the reactive elements. Because the series circuit formed by the resistor 138, the inductance 135, and the capacitance 136 is series resonant, the current which flows therein is in phase with the voltage Eb. Therefore, the voltage Ec across the capacitor 136 lags the voltage Eb by 90°, while the voltage El across the inductance 135 leads the voltage Eb by 90°. Because the voltages El and Ec are both separated by 90° in phase from the voltage Eb, either one could be used for the vector addition to be described below, but in the present instance it is the voltage Ec which enters into this vector addition.

Secondly, the phase converting means 61 includes means energized from the other one (here Ea) of the two rotor voltages Ea, Eb for producing a second alternating signal in phase therewith and proportional in amplitude thereto. As here shown, such means take the form of first and second resistors 139, 140 connected in series across the voltage Ea. The resistor 139 is preferably formed as an adjustable potentiometer, having a movable wiper 139a, for a purpose to be described. The voltage Ea' between the upper end of the resistor 139 and the wiper 139a will hereinafter be referred to simply as the voltage across the resistor 139. It will be seen that the resistors 139, 140 form a voltage divider, so that the voltage Ea' appearing across the resistor 139 is in phase with the voltage Ea, and directly proportional to, although smaller in amplitude than, the voltage Ea.

While it would be possible to add vectorially the voltages Ec and Ea' in order to produce the desired output voltage Eo, the arrangement shown in FIG. 3 employs a center-tapped coil having a first half which constitutes the inductance 135 and a second half which constitutes an equal inductance 141. Preferably, the center-tapped coil 135, 141 is adjustable, as indicated, so that the inductance 135 may be conveniently tuned to series resonance with the capacitor 136. When the value of inductance 135 is changed, the value of the inductance 141 is correspondingly changed so that the two inductive reactances 135 and 141 are always equal. Because the two halves of the center-tapped coil are inductively coupled, the voltage induced in the inductance 141 will be equal to, but of opposite phase from, the voltage El appearing across the first half inductance 135. Thus, the voltage appearing across the second half of the center-tapped coil may be designated by the symbol —El. This makes the voltage —El lie in phase with the voltage Ec. Therefore, this arrangement of the voltage Eb' appearing across the series combination of capacitor 136 and inductance 141 is displaced 90° in phase from the voltage Eb; and the voltage Eb' is double the amplitude of the voltage Ec appearing across the capacitor alone. Therefore, the use of a center-tapped coil as shown in FIG. 3 enables the creation of a voltage Eb' shifted 90° in phase from the resolver voltage Eb and yet which is of greater amplitude, and thus less subject to significant amplitude or phase errors when the voltage Eb changes in frequency or amplitude, as discussed below.

In order to produce the final output voltage Eo, the two voltages Ea' and Eb' are vectorially added. To accomplish this, two output terminals 144 and 145 are connected to the extremities of the series combination represented by the inductance 141, the capacitance 136, and the resistor 139, i.e., the portion of the potentiometer 139 between its upper end and the wiper 139a. The resultant variations of the output voltage Eo with changes in the rotor angle θ will be more fully explained below.

In review, however, it will be seen that the phase converting circuit 61 of FIG. 3 includes means formed by the series resonant circuit 138, 135, 136 for producing first and second auxiliary voltages Ec and El which respectively lag and lead the first rotor voltage Eb. Additionally, means constituted by the second half of the center-tapped inductance are provided for producing a third auxiliary voltage —El equal in amplitude and displaced 180° in phase from the second auxiliary voltage El. Thirdly, means formed by the resistors 139, 140 are provided for producing a fourth auxiliary voltage Ea' which is in phase agreement with, and proportional in amplitude to, the second rotor voltage Ea. The terminals 144, 145 and connections thereto constitute means for vectorially adding the first, third, and fourth auxiliary voltages Ec, —El and Ea' to derive the output voltage Eo. The voltage Eb' which is displaced in phase by 90° from the voltage Eb is constituted by the vector sum of the voltages —El and Ec.

The resistors 139 and 140 in the present instance constitute a voltage divider, forming means to make the maximum amplitude of the voltage Ea' equal to the maximum amplitude of the voltage Eb'. In other words the attenuation factor which relates the amplitude of Eb' to the rotor voltage Eb is made equal to the attenuation factor which relates the amplitude of the voltage Ea' to the amplitude of the voltage Ea. As an example, in a typical circuit arrangement the voltage Eb' might be equal to one fifth of the amplitude of the voltage Eb due to the attenuation or voltage dividing effects of the elements 138, 135 and 136. Therefore, the resistor 139 (that is, the potentiometer wiper 139a) is adjusted so that its effective value is equal to one fifth the combined value of the resistor 140 and the portion of resistor 139 below the wiper 139a. In this way, the voltage Ea' is made one fifth the amplitude of the voltage Ea. Thus, when the rotor voltages Ea and Eb are equal in amplitude the voltages Ea' and Eb' will be equal in amplitude.

FIGS. 11, 12 and 13 illustrate by vector diagrams the amplitude and phase relationships of the various voltages in the phase converting circuit 61 (FIG. 3) when the rotor angle θ has the respective values of 0°, 45° and 90°. When θ is 0° (FIG. 11), the voltages Eb and Eb' are both of zero amplitude, the voltage Ea has its maximum amplitude Em, and the auxiliary voltage Ea' constitutes the entire output voltage Eo. That is, if the voltage Ea having a maximum amplitude Em is represented by the vector 150 in FIG. 11 at a 0° phase angle, then the voltage Ea' which appears across the resistor 139 in FIG. 3 is represented by a vector 151 which is in phase with the vector 150 and of smaller amplitude because of the attenuating effect of the voltage divider 139, 140. The vector 151 in FIG. 11 indicates by way of example that when the rotor angle θ is zero, the output voltage Eo has an amplitude of $$\frac{Em}{5}$$

and a phase angle of 0°.

When the rotor angle θ is 45° (FIG. 12), both the voltage Ea and the voltage Eb are represented by a vector 152 which is .707 times the maximum amplitude Em and which lies at a 0° phase angle (compare FIG. 6a and 6b). Voltage Ea', appearing across the resistor 139, therefore is represented by a vector 154 having a 0° phase angle and one fifth the length of the vector 152. The voltage Ec appearing across the capacitor 136 (FIG. 3) lags the voltage Eb by 90° and is thus represented by a vector 155 in FIG. 12. The amplitude of the voltage Ec represented by this latter vector is one tenth the amplitude of the voltage Eb represented by the vector 152. The voltage El appearing across the inductance 135 is represented by a vector 156 of identical length but which leads the voltage vector 152 representing Eb by 90°. Since the voltage —El appearing across the second half of the center-tapped coil is 180° out of phase with the voltage El, it is represented by a vector 158 shown in FIG. 12. If the vectors 155 and 158 are added together, they result in a vector 159 which represents the voltage Eb' lagging by 90° the vector 152 and having an amplitude or length equal to that of the vector 154. When the vectors 154 and 159 are added, the result is a vector 160 which represents the output voltage Eo, the latter thus having a phase angle of —45° and having an amplitude equal to $$\frac{Em}{5}$$

When the rotor angle $\theta$ is 90° (FIG. 13), the voltages Ea and Ea' are both zero, but the voltage Eb has its maximum amplitude Em and is disposed at a 0° phase angle, as represented by a vector 161. With this voltage Eb applied to the series resonance circuit, the voltage Ec across the capacitor 136 is represented by a vector 162 which lags by 90° and which has an amplitude of $$\frac{Em}{10}$$

The voltage El appearing across the inductance 135 is of similar amplitude, but leads by 90°, as illustrated by the vector 163 in FIG. 13. The voltage —El therefore also has a —90° phase angle and is represented by a vector 164. Direct addition of the vectors 162 and 164 result in a vector 165 which represents the voltage Eb' and also represents the voltage Eo, because the voltage Ea' is zero. Thus, when the rotor angle $\theta$ is 90° the voltage Eo has an amplitude of $$\frac{Em}{5}$$

and a phase angle of —90°.

From the foregoing specific examples, it will be apparent that as the rotor of the resolver 40 is turned and the rotor voltages Ea, Eb vary in amplitude and phase polarity, the phase covering circuit 61 produces an output voltage Eo which remains substantially constant in amplitude but which changes in phase angle in unison with the angle $\theta$. This is more fully illustrated by FIGS. 5c through 10c which respectively show the phase positions and amplitudes of the voltages Eb' and Ea' together with their vector combination to produce the output voltage Eo when the rotor angle $\theta$ is 0°, 45°, 90°, 135°, 180° and 225°. It will be apparent that the vectors Eb' shown in FIGS. 5c through 10c correspond to the vectors Eb shown in FIGS. 5b through 10b, but with the vectors Eb' lagging the vectors Eb by 90°. When these lagging Eb' vectors are combined with the Ea' vectors, the resultant output voltage Eo is one which is substantially constant in amplitude but which changes in phase according to the value of the rotor angle $\theta$.

While FIGS. 5a–10a; 5b–10b; and 5c–10c illustrate the change in phase of the output voltage Eo as progressively lagging when the resolver rotor is turned in a counterclockwise direction, it will be readily apparent that the phase angle of the output voltage Eo will progressively lead when the resolver rotor is turned in a clockwise direction.

The phase-variable output voltage Eo is produced in the present instance despite the fact that the resolver 40 (FIG. 3) need be excited only with one single phase alternating voltage 45. Although it is possible and has been the practice in certain prior systems to excite a resolver with polyphase A.C. signals, this requires that the two or three phase A.C. sinusoidal excitation voltages be not only accurately spaced apart from one another (by 90° or 120°) in phase, that they also have very pure sinusoidal waveforms maintained precisely balanced in amplitude, and that they all have a precisely maintained constant phase relationship to the initial reference pulses 32 and the square wave voltage 48. Moreover, the present arrangement of exciting the resolver with a single phase alternating voltage 45 and then converting the resolver output voltages into a phase-variable voltage Eo, is accomplished by the use of passive elements in the converting circuit 61, such elements being stable with temperature, vibration, and age so that precise phase converting action is obtained without resort to expensive and sensitive components. The present arrangement, including the phase converting circuit 61, is readily adjusted for operation, since it is only necessary to apply a signal at the operating frequency $f$ (e.g., 200 c.p.s.) to the series resonant circuit, and then adjust the center-tapped coil formed by the two halves 135, 141 until the circuit is series resonant and current flow is maximized. Then, the potentiometer 139 is adjusted in value to make the voltages Ea' and Eb' equal in amplitude when the voltages Eb and Ea have equal amplitudes. With this, the phase converting circuit 61 is properly tuned and the attenuation factors balanced for proper operation. The total resistance presented by the resistors 139 and 140 across the winding 44a is initially made equal to the total resistance presented across the winding 44b by the resistor 138 and the ohmic resistance of the inductance 135. This balances or equalizes the loading on the two resolver output windings.

The phase combining circuit 61 is, moreover, relatively immune in its operation to changes in the frequencies and maximum amplitudes of the sinusoidal input voltages Ea and Eb. This is particularly important because even though the reference pulses 32 (FIG. 1) and the excitation voltage 45 have a substantially constant frequency of 200 c.p.s., the frequency of the voltages Ea and Eb increases or decreases when the resolver rotor 40b is turned in one direction or the other. Normally such a change in frequency would cause the phase converting circuit to produce a substantial error in the phase angle of the output voltage Eo. The present phase converting circuit, however, reduces this phase error due to the velocity of the rotor to a very small value.

In a specific commercial product embodying the invention, the maximum speed at which the movable element 20 (FIG. 1) may be driven (in response to a rapid phase shift of the control pulses 34 relative to the reference pulses 32) is about two inches per second. The resolver rotor is geared to the lead screw 24 with a ratio that makes the rotor turn one revolution for each 0.1 inch which the element 20 travels. Thus, when the movable element is traveling at a maximum velocity of two inches per second, the resolver rotor 40b will be turning at an angular velocity of 20 revolutions per second, and the frequency of the voltages Ea and Eb induced in the rotor windings 40a, 40b will include 180 c.p.s. and 220 c.p.s. components. As noted below, one of these frequency components is cancelled by the converting circuit when the rotor is turning clockwise, and the other component is cancelled when the rotor is turning counterclockwise. Thus, it may be said that the output voltage Eo will have a frequency of 180 or 220 c.p.s. when the rotor is turning one direction or the other at 20 revolutions per second.

To illustrate the small effect which this 10% change in frequency of the voltages Ea and Eb has on the phase angle of the output voltage Eo in the phase converting circuit 61, some specific, exemplary values of the resistance and reactive components of the circuit will be given.

Assume first that the resolver rotor 40b is stationary and disposed at a position such that the rotor angle $\theta$ equals 90°. Under these conditions:

Frequency of excitation voltage 45=200 c.p.s.
Capacitance 136=2.56 μf.
Inductance 135=0.248 henry.
Resistor 138=3500 ohms.
$Eb$=7 volt R.M.S. at 200 c.p.s., and at a 0° phase angle.
Therefore:

$$X_c = \frac{1}{2\pi f c} = \frac{10^6}{2\pi \times 200 \times 2.56} = 311 \text{ ohms}$$

$$X_1 = 2\pi f L = 2\pi \times 200 \times .248 = 311 \text{ ohms}$$

Current I in series resonant circuit =

$$\frac{7}{3500 + j311 - j311} = 2.00 \text{ ma.} @ /0°$$

Because the rotor angle is assumed to be $\theta = 90°$, the voltage E$a$ and voltage E$a'$ are both zero so that:

$$E_o = E_b' = E_c + E_1 = I(X_1 + X_c)$$
$$= .002(311 + 311) = 1.24 \text{ volts } /-90°$$

Now, when the rotor is turning at 20 revolutions per second the frequency of the resolver output voltage E$b$ will be 220 c.p.s., i.e., 1.1 times the previously considered frequency of 200 c.p.s.

Under these conditions:

$$X_1' = 311 \times 1.1 \text{ ohms}$$

$$X_c' = \frac{311}{1.1} \text{ ohms}$$

The net or uncancelled reactance of the series circuit will be:

$$X_1 - X_c = 311\left(1.1 - \frac{1}{1.1}\right) = 59.4 \text{ ohms}$$

Thus the current flow in the series circuit will be:

$$I = \frac{7}{3500 + j59.4} \cong 2.00 \text{ ma.} /59'$$

It will be seen from the last expression that the amplitude of the current flow is hardly changed at all when the frequency of the input voltage E$b$ is increased by 10% (assuming that E$a$ and E$b$ do not change in amplitude). This is accomplished in part by the fact that the resistor 138 has a high ohmic value compared to the reactance of the capacitance 136 and inductance 135. However, the two voltage E$c$ and $-El$ will lag the rotor voltage E$b$ by 90°59', rather than 90°. Let it be assumed further that even though the rotor is turning at a velocity of 20 revolutions per second, the rotor is passing through its position at which $\theta$ equals 90°. Under these conditions, the entire output voltage E$o$ will at that instant be constituted by the voltage E$b'$, and voltage E$a'$ will be zero. When this occurs, the output voltage E$o$ will be $$E_o = E_b' = E_c + E_1 = I(X_1 + X_c) \cong .002[311\left(1.1 + \frac{1}{1.1}\right)]$$
$$= 1.25 \text{ volts}/90°59'$$

Thus the voltage E$o$ is displaced by 59 minutes from the true 90° phase angle which it should occupy. However, because 59 minutes of the angle of rotation of the resolver rotor represents only about 278 microinches of travel of the element 20, the dynamic velocity error is indeed held to very small value. In those instances when the rotor angle has values other than 90° or 270°, then the output voltage E$o$ will be formed in part by the voltage E$a'$ and the dynamic phase error appearing in the output voltage E$o$ will be even less. It is, therefore, an important advantage of the present apparatus that the velocities at which the resolver rotor turns have a relatively small effect on the accuracy of the phase angle of the output voltage E$o$.

Furthermore, while the foregoing exemplary calculations demonstrate that the effect on the phase angle accuracy of the output voltage E$o$ due to the velocity of the resolver rotor is held to a small value (angle of about 59', representing 278 microinches in the travel of the movable element 20), it may also be noted that this small phase and position error is cyclic in nature, and is relatively less detrimental when the magnitude of the error is greatest due to a high rotational velocity of the resolver roto.

It may be demonstrated that when the resolver rotor is turning at 20 revolutions per second, as assumed in the foregoing discussion, there are two angular positions of the rotor at which the phase error goes to zero. These two positions are represented by the rotor angle $\theta$ having values of 0° and 180° and when the second output winding voltage E$b$ is instantaneously zero. Also, there are two positions of the rotor ($\theta = 90°$ and 270°) when the voltage E$a'$ is zero and the phase angle of the output voltage E$o$ is displaced by an angle of 59 minutes from the correct phase angle. If a plot of the phase error versus rotor angle were made, the phase error would go through two cycles for each revolution of the resolver rotor. Since it has been assumed that the resolver rotor is turning at 20 revolutions per second, the phase error varies cyclically at 40 cycles per second and with a peak-to-peak amplitude of 59 minutes. It would at first glance appear, then, that the movable element 20 driven by the servo system would have a cyclically variable position error varying at a frequency of 40 cycles per second and with a peak-to-peak magnitude of 278 microinches.

However, in actual practice the servo mechanisms including the motor 22 (FIG. 1) which drive the movable element have an upper cutoff frequency beyond which they cannot accurately respond. In machine tool servo drives, for example, the overall servo loop for driving the movable element 20 cannot faithfully follow signals which vary at a frequency above 15 c.p.s. or more. Therefore, when such a servo is commanded to move the element 20 at a maximum velocity of 120 inches per minute, and the controlling signal from the phase discriminator includes a 40 c.p.s. cyclical phase error, the servo system simply will not reproduce corresponding cyclical errors in the movement of the element 20.

Practically speaking, when the movable element 20 is being driven at a speed of 45 inches per minute, and the resolver rotor is turning at a velocity of 7.5 revolutions per second, the theoretical cyclical position error (calculated by proration from the foregoing example) will have a frequency of 15 cycles per second, and a peak-to-peak amplitude of about 104 microinches. With this error variation in the D.C. signal received from the phase discriminator, the servo drive will cause the movable element 20 to have a 15 cycle-per-second position error which is about 70% of the theoretical 104 microinch amplitude. For higher speeds, the phase error and servo signal error increase in frequency and amplitude, but the attenuation or smoothing effect of the servo drive system is also greater. Therefore, the small phase error, which builds up as the resolver rotor velocity and output signal frequency increase, is fortuitously limited by inability of the servo mechanism drive to fully respond to higher frequency error variations. The present system, as a practical matter thus substantially eliminates errors in the instantaneous position of the movable element 20 when the latter is traveling at appreciable speeds and the frequency of the voltages induced in the resolver windings changes from the nominal frequency at which the resolver is excited.

It has been assumed in the foregoing exemplary analysis that the amplitudes of the rotor voltages E$a$ and E$b$ do not change with variations in velocity of the rotor. Actually, such amplitude variations do occur, and will be discussed below.

Compensation for stray capacitance

In actual applications of the phase control apparatus here described, it is a frequent requirement that the synchronous induction device or resolver 40 be located at a considerable physical distance from the control circuits. In these instances, the exciting voltage 45 produced at the output of the amplifier 59 is transferred to the stator winding 42a through a long, shielded conductor which prevents spurious pickup of noise. Correspondingly, the four wires leading from the resolver rotor windings 44a, 44b are made into a composite cable having a grounded shield surrounding it so as to prevent pickup of spurious noise signals which might otherwise distort the rotor voltages Ea and Eb.

FIG. 4 is intended to illustrate this physical arrangement, wherein the four conductors 170a, b, c, and d leading from the two rotor windings 44a and 44b are of relatively great length, as indicated by the discontinuities shown therein. These four conductors are formed as part of a cable surrounded by a conductive sheath diagrammatically illustrated at 171 in FIG. 4. When such a shielding sheath is disposed around the four conductors 170a–d and connected to a point of ground potential, there is inherently created some stray capacitance between the sheath and the individual conductors. Moreover, there may be some small stray capacitance between the rotor windings 44a, 44b and the housing of the resolver 40, if the latter is electrically connected to a point of ground potential. The stray capacitance between the conductor 170a and the grounded sheath 171 is illustrated by the dotted line capacitor 172a in FIG. 4; and corresponding stray capacities between the remaining conductors and the grounded sheath are illustrated at 172b, c, and d.

Because the rotor winding 44b has a very low impedance, the stray capacitance 172a may be viewed, as a matter of equivalence, as being connected in parallel with the stray capacity 172b. And because the conductors 170b and 170c are connected directly together in the phase converting circuit, the capacitance 172b may be considered as lumped together with the stray capacity 172c. Because the wiper 139a is grounded, the stray capacitance 172c may be viewed, as a matter of electrical equivalence, as being connected across the resistance 139. Thus, for convenience of understanding, it may be considered that the distributed, stray capacities 172a, b, c shown in FIG. 4 are removed and replaced by a single equivalent capacitance 172e connected in parallel with the resistor 139. In like manner, the distributed stray capacitance 172d may be viewed as being removed and replaced by a single capacitance 174 connected in parallel with the resistor 140.

Considering the circuit of FIG. 4, therefore, with an effective capacitance 174 in parallel with resistor 140 and a different effective capacitance 172e in parallel with resistor 139, the voltage Ea' which appears across the resistor 139 will be shifted in phase somewhat relative to the voltage Ea. This would, unless corrected, create some slight error in the correlation of the phase angle of the output voltage Eo to the physical angle θ of the resolver rotor 40b; and any such phase error would change or vary as the frequency of the rotor voltage Ea changes due to different rotational velocities of the rotor.

In keeping with an important feature of the present invention, this spurious phase displacement between the voltage Ea and the voltage Ea', due to stray capacitance from conductors to a grounded shield, is avoided by means associated with the series circuit formed by the resistors 139 and 140. More specifically, a neutralizing capacitor 175 is connected in parallel with the resistor 139. The reactance of the physical capacitor 175 and the effective capacitor 172e in parallel therewith, is made to have the same ratio to the reactance of the effective stray capacitor 174 as the ratio between the values of the resistors 139 and 140. In other words, if the resistor 140 is four times as great in its ohmic value as the resistance 139, then the capacitor 175 will be given a capacity which, when added to the effective capacity of the effective capacitor 172e, makes the total capacitance in parallel with resistor 139 four times as great as the value of the lumped stray capacitor 174. Because the lumped stray capacitor 172e (viewed as replacing stray capacities 172a, b, c) is not large enough by itself, and additional physical capacitor, shown at 175, is added in parallel with resistor 139. With this arrangement, any phase shift due to a stray capacity (that is, due to the stray capacities 172a–d) is neutralized and the voltage Ea' appearing across the parallel resistance 139 and capacitance 175 is maintained substantially exactly in phase with the rotor output voltage Ea.

The integration of the output voltage

As previously discussed, the frequency of the rotor voltages Ea and Eb will be increased or decreased relative to the frequency of the resolver excitation voltage 45 when the resolver rotor 40b is turned in one direction or the other at different velocities. This change in frequency is not extremely detrimental to accurate performance since, as noted above, the phase converting circuit 61 does not produce an appreciable error in the phase of the output voltage Eo due to a departure from the design frequency.

Referring again to FIG. 3, the output voltage Eo which shifts in phase according to the angle θ of the resolver rotor, is supplied as the input to the integrator or integrating amplifier 64, and then through an impedance-transforming amplifier 64a, where it appears as a final voltage Ef which forms one input signal to the phase discriminator 38 (FIG. 1). Before discussing the operation and advantages of the integrating amplifier 64, it will be helpful to consider some basic characteristics of the resolver 40 and the phase converting network 61 described above.

Referring to FIG. 14a, the resolver 40 and phase converting circuit 61 are there diagrammatically illustrated with the single stator winding 42a energized by a single phase A.C. voltage 45. As previously noted, this produces a sinusoidally pulsating bi-directional flux, represented by the vector $+\phi$, $-\phi$ (FIG. 14b) which is alined with the rotor winding 42a when the resolver rotor is at a reference position $\theta=0°$. The vector $+\phi$, $-\phi$ is assumed to be always disposed along the horizontal axis of FIG. 14b, but varies sinusoidally in length and direction.

As is well known to those skilled in the art, a bi-directional pulsating magnetic field $\phi$ produced by a sinusoidal exciting voltage may be considered, for purposes of analysis, to be the vector sum of two separate magnetic fields which rotate in opposite directions at a frequency equal to the pulsation frequency of the field $\phi$, and which have a constant magnitude equal to half the maximum magnitude of the pulsating field $\phi$. Two such counter-rotating magnetic field vectors are illustrated in FIG. 14b, the vector $\phi 1$ (solid line) rotating counterclockwise, and the vector $\phi 2$ (dashed line) rotating clockwise. When the vectors $\phi 1$, $\phi 2$ are crossing one another and pointing to the right, the pulsating field $\phi$ has its maximum positive value; when such vectors pass through vertically opposite positions, the field $\phi$ passes through a zero value; and when the counter-rotating vectors are crossing one another and pointing to the left, the pulsating field $\phi$ has its maximum negative value.

Consider first the effect which the rotating field $\phi 1$ by itself has in contributing to the output voltage Eo, assuming that the resolver rotor and the windings 44a, 44b are stationary, but at a rotor angle of $\theta=45°$, as shown in FIG. 14b. The voltage Ea1 (FIG. 14c) induced in the winding 44a by the counterclockwise rotating field $\phi 1$ is constant in amplitude, regardless of the rotor angle θ, but its phase angle changes with the rotor angle θ. The same is true of the voltage Eb1 induced in the winding 44b by the rotating field ϕ1, and the voltage Eb1 is equal in amplitude to the voltage Ea1. However, the voltage Eb1 always leads the voltage Ea1 by 90 electrical degrees due to the fact that the windings 44a, 44b are separated physically by 90°. When the resonant means of the phase converting circuit 61 (FIG. 3) changes the voltage Eb1 into a voltage Eb1' which lags Eb1 by 90°, the voltage Eb1' is in phase with the voltage Ea1 (and Ea1' produced by the circuit 61). This is shown vectorially by FIG. 14c which indicates that the voltages Ea1' and Eb1' are directly in phase with one another and add together to produce the output voltage Eo1 as a result of the rotating field ϕ1. The voltage Eo1 is of constant amplitude and has a phase angle equal to the rotor angle θ.

Consider next the effect which the rotating field ϕ2 by itself has in contributing to the output voltage Eo. The voltage Ea2 induced in the winding 44a by the clockwise rotating field ϕ2 is of constant amplitude, regardless of rotor angle θ, but its phase angle will change with the rotor angle. The same is true of the voltage Eb2 induced by the flux ϕ2 in the winding 44b, but the voltage Eb2 will always lag the voltage Ea2 by 90° due to the fact that the windings 44a, 44b are physically separated by 90°. This is shown vectorially in FIG. 14d. The voltage Eb2 is, however, shifted 90° in a phase lagging direction by the phase converting circuit 61 to produce the voltage Eb2'. The latter voltage is thus equal and opposite in phase to the voltage Ea2' (FIG. 14d). Thus, the output voltage component Eo2 contributed by the rotating field ϕ2 is always zero.

The significance of the foregoing analysis is that, although the resolver 40 is excited by a single phase A.C. voltage 45 so as to have a pulsating magnetic field ϕ therein, the effective operation of the resolver 40 combined with the converting circuit 61 is to produce an output voltage Eo indistinguishable from a voltage which would be induced in a single resolver output winding by a continuously rotating magnetic field of uniform magnitude. Thus, for purposes of analysis and understanding, it may be considered that the output voltage Eo from the phase converting circuit 61 is the same as an output voltage induced in a single rotor winding of a synchronous induction device excited with polyphase voltages to have a constant magnitude rotating magnetic field therein.

This concept is important in understanding the effects which are produced when the resolver rotor is not stationary, but on the contrary, is rotating with an appreciable angular velocity as the movable element 20 (FIG. 1) is moved rapidly from one position toward another.

Referring to FIG. 14b, let it be assumed that the rotor (i.e., windings 44a, 44b) is rotating at a speed of 20 revolutions per second in a clockwise direction and that, in effect, the output voltage Eo of the phase converting circuit 61 is produced solely by the field ϕ1 (which is rotating in a counterclockwise direction) cutting the winding 44a. The frequency of the output voltage will increase from 200 c.p.s. (when the rotor is stationary) to 220 c.p.s. because the winding 44a is turning in a direction opposite to the rotation of the field ϕ1. In addition, however, the amplitude of the output voltage Eo will increase, because the output voltage is instantaneously proportional to $$N\frac{d\phi}{dt}$$

where N is the number of turns of the winding 44a and $d\phi/dt$ is the rate of change of flux linkage therewith. The maximum value of $d\phi/dt$, which represents the amplitude of the voltage Eo, is increased as the velocity of the rotor increases in a clockwise direction.

Conversely, if the rotor is turning in a counterclockwise direction, the frequency and amplitude of the output voltage Eo will both be decreased from the values which they otherwise have when the rotor is stationary. This is so because the winding 44a is now turning in the same direction as the magnetic field ϕ1 and the maximum value of the rate of change of flux linkage, $d\phi/dt$, is less. For example, if the frequency of the rotating field ϕ1 is 200 c.p.s., the frequency of the output voltage Eo will decrease to 180 c.p.s. and its amplitude will decrease by 10% when the rotor turns counterclockwise with a velocity of 20 revolutions per second.

Thus, the resolver 40 and the converting circuit 61 shown in FIGS. 1 and 3 produce an output voltage Eo which not only changes in frequency, but which also varies considerably in amplitude as the velocity of the rotor changes from its maximum value in a clockwise direction to a maximum value in the counterclockwise direction. This frequency and amplitude variation of the output signal likewise occurs with an arrangement employing a synchronous induction device excited with polyphase voltages and producing an output voltage Eo directly from an output winding without resort to the phase converting circuit 61.

The difficulty or problem which arises from this velocity-amplitude variation in the output voltage Eo is that the phase discriminator 38 (FIG. 1) may not be perfectly insensitive to changes in amplitude of the sinusoidal voltage which is applied to its input terminal 38a. When the amplitude of the signal Eo increases or decreases, its slope at those points where it crosses the zero axis increases or decreases, and the D.C. output voltage derived from the discriminator (and which in turn determines the velocity at which the servo motor 22 runs), increases or decreases slightly. This is true of some types of phase discriminators, particularly the more frequently used, well known gated type.

In keeping with one important part of the present invention, provision is made to derive a final voltage Ef (supplied to one input of the phase discriminator) which is not, in effect, instantaneously proportional to the rate of change of flux linkage, $$N\frac{d\phi}{dt}$$

in a synchronous induction device, but rather which is, in effect, instantaneously proportional to a flux linkage ϕ. To accomplish this, the output voltage Eo produced by the converting circuit 61 in FIG. 3 (and which is in effect instantaneously proportional to $d\phi/dt$, as explained above) is supplied as the input signal to an integrator, so that the output of the latter becomes a final voltage Ef which is proportional to the integral of $d\phi/dt$, i.e., proportional to a flux linkage ϕ.

As shown in FIG. 3, such an integrator takes the form of an amplifier comprising a pentode 200 having its cathode connected to a point of ground potential and its anode connected through a load resistor 201 to a point of positive voltage here indicated as B+. A negative feedback connection which transmits a signal varying as the rate of change of the amplifier output signal is formed by a capacitor 202 connected between the output terminal 204 of the amplifier and its input terminal 206, the latter being connected directly to the control grid of the pentode 200. It is well known that such as amplifier has an integral transfer function, although other types of equally satisfactory integrators will readily suggest themselves to those skilled in the art.

The output voltage Eo appearing at the terminals 144, 145 of the phase converting circuit is applied, through an input resistor 203, between the grid and cathode of the amplifying pentode 200, and the signal appearing at the amplifier output terminal 204 varies as the integral of the input signal Eo. As the frequency of the signal Eo varies above or below the nominal design frequency of 200 c.p.s.

due to the velocity of the resolver rotor, the gain of the integrating amplifier 64 varies inversely with changes in frequency. Thus, the voltage appearing at the output terminal 204 varies instantaneously in proportion to the flux φ of a rotating magnetic field linking a winding in the resolver 40, and remains substantially constant in amplitude as the frequency of the voltage Eo changes between 180 and 220 c.p.s. This integrated voltage is passed to the grid of the cathode follower amplifier 64a having a primary winding 205 of a transformer 209 connected across its cathode resistor 207. The final output voltage Ef thus appears at the terminals of a secondary winding 208, and this voltage may be supplied as one input to the terminal 38a of the phase discriminator 38 shown in FIG. 1.

The advantageous operation contributed by the integrator 64 may now be summarized. First, the final voltage Ef is an alternating voltage of substantially constant amplitude which varies in phase (relative to the phase of the reference pulses 32 in FIG. 1) according to the angular displacement θ of the two relatively movable parts of the synchronous induction device or resolver 40. More importantly, however, the amplitude of the final voltage Ef is not only substantially constant as the displacement θ takes on different values, but it remains substantially constant as the velocity θ' of the relatively movable resolver parts varies. This means that the entire system is much less sensitive to changes in the output of the phase dicriminator 38 due to the movable element 20 being traversed at different speeds. Thus, the output of the phase discriminator 38 more precisely represents the difference between the desired and actual values of the controlled variable, i.e., the position of the movable element 20.

But other important advantages accrue from the use of the integrator 64. Generally stated, the integrator further affects the final voltage Ef so that the adverse effects of (a) noise or spike distortion and (b) harmonic distortion, which may be present in the output voltage Eo, are substantially reduced or eliminated.

Before considering these two distortion factors, the well known characteristics of two types of phase discriminators will be summarized. The "crossover" type of discriminator (shown in FIG. 1) may be constructed to produce a D.C. output voltage which varies linearly with the phase angle separating its two input signals as that phase angle changes through a wide range from −180° to +180°. This wide range of linearity is very desirable in closed loop servo control systems. However, the crossover type of discriminator, as its name implies, is sensitive to the time or phase of the zero-axis crossing of the input waveform applied as one of its input signals. If the zero crossing point of the input wave applied to the terminal 38a is displaced from the position it should occupy, the D.C. output voltage will contain a corresponding error. On the other hand, a conventional "gated" phase discriminator is not so sensitive to errors in zero crossing points, due to the half cycle averaging effect. However, the "gated" discriminator produces a D.C. output voltage which changes from a negative maximum to a positive maximum value as the phase angle between the two input signals varies from −90° to +90°; and over this range the D.C. output voltage is linearly related to that phase separation only as the latter changes from about −36° to +36°. This narrow range of operation, and even narrower range of linearity, of the "gated" discriminator makes the "crossover" discriminator preferable in closed loop servo systems.

With regard to noise or spike distortion, it has been found that the output voltage Eo (FIG. 3) may often contain small "spikes" of noise which are of relatively short duration superimposed on the otherwise sinusoidal waveform. FIG. 15 illustrates the sinusoidal output voltage Eo with noise spikes 210a, 210b, 210c shown to an exaggerated degree thereon. Such short, high frequency spikes may originate from a variety of causes, the principal ones being "brush bounce" in the resolver 40 (the terminals of the windings 44a, 44b lead through brushes, not shown) or slight imperfections in the internal magnetic circuit of the resolver which produce short departures of the effective $d\phi/dt$ (to which the voltage Eo is in effect proportional) from a perfectly sinusoidal variation. The same type of noise spikes may appear in the output voltage taken from a polyphase excited induction device, in which a phase-variable output voltage is induced without resort to the phase converting circuit 61. If a noise spike on the waveform voltage Eo happens to occupy that position shown at 210c in FIG. 15, it will cause the voltage Eo to pass through the zero axis at an instant slightly earlier (or later) than the true sinusoidal voltage would do so. If a "crossover" type phase discriminator is being employed, its D.C. output voltage would erroneously indicate the phase of the output voltage Eo to be slightly more leading (or lagging) than it actually is and position errors of the element 20 could result. However, because the output voltage Eo appearing on the terminals 144, 145 in FIG. 3 is first passed through the integrating amplifier 64, the resultant final voltage Ef is smoothed and filtered so that the noise spikes which are shown in FIG. 15 are hardly detectable at the points 211a, 211b and 211c on the waveform for the voltage Ef (FIG. 16). Thus, the final voltage Ef produced by integrating the voltage Eo will permit the phase discriminator to operate with higher precision and accuracy despite the presence of "brush bounce" or other noise spike distortions in the output voltage Eo.

Regarding harmonic distortions, it has been found that the output voltage Eo (FIG. 3) may sometimes be distorted from a truly sinusoidal shape due to the presence of higher order harmonic components (e.g., third, fifth, and seventh harmonics) therein. For example, while the filters 52 and 55 (FIG. 1) function in the intended manner, they are not absolutely perfect and may pass very low amplitude harmonics. The amplifier and phase inverter 58 and the push-pull amplifier 59, in spite of the higher frequency negative feedback provided by the capacitor 108 and resistor 109, still permit very low amplitude harmonics to exist in the excitation voltage 45. Also, a single induction device, such as the resolver 40, will generate some higher order harmonics in its output voltage even when excited with a perfectly sinusoidal voltage of fundamental frequency, due to very slight non-linearities in the magnetic paths therein; and this effect is increased when a manually adjusted differential resolver (not shown) is cascaded (in a well known manner) with the feedback resolver 40. Harmonics are also present in the output voltage of a polyphase excited induction device, which produces a variable phase output voltage without resort to the phase converting circuit 61. In this case, the harmonic components are more pronounced, because there are more potential sources of harmonic distortion, viz, variation of magnetic circuit characteristics as the field revolves around the air gap in the induction device, and harmonic distortion or amplitude variation in any or all of the plural exciting voltages.

For purposes of illustration, FIGS. 17, 18, and 19 show the sinusoidal fundamental frequency component 220 of the output voltage Eo, together with only the third harmonic component 221 (to an exaggerated scale) when the resolver rotor occupies three different angular positions.

In FIG. 17, the addition of the fundamental and third harmonic components 220, 221 results in a composite output voltage Eo (shown at 222) which is distorted from a truly sinusoidal shape; the actual crossover point 224 occurs earlier in time than the zero crossover point 225 which would be obtained in the absence of the third harmonic component. Thus a phase lead error e is created by the presence of the third harmonic component, and if the voltage Eo were supplied to the discriminator 38 (FIG. 1), such error would be reflected in the output voltage of the latter and the position of the movable element 20.

On the other hand, when the resolver rotor is at another angular position, the third harmonic component 221 may be phased relative to the fundamental such that their zero crossing points coincide, as shown in FIG. 18. There is no crossover phase error under these conditions. But when the resolver rotor is in still another angular position, the third harmonic component 221 may be phased relative to the fundamental 220 as shown in FIG. 19. When the components 220, 221 are added, the composite output voltage Eo has the shape shown at 222, with its zero crossing point 224 lagging the crossing point 225 of the fundamental wave. Under these conditions a phase lag error $e_1$ exists.

It will be seen, therefore, that the presence of third and higher order harmonic components in the output voltage Eo produces an error in the phase of the zero crossing points, and that this error varies cyclically from lagging to zero to leading as the resolver rotor turns through different angular positions. The result is a similar cyclical error variation in the output of the phase discriminator 38 as the resolver rotor turns, and thus a small instantaneous error in the position of the movable element 20.

The use of the integrator 64 (FIGS. 1 and 3) to convert the output voltage Eo into the integrated voltage Ef before application to one input of the phase discriminator substantially eliminates the errors which would otherwise be created due to harmonic distortions. As noted previously, the gain of the integrating amplifier 64 for different frequency components is inversely proportional to the frequency, so that the fundamental frequency component of the voltage Eo is amplified to a greater extent than the higher order harmonic components. The final voltage Ef, therefore, contains higher order harmonics which are so drastically reduced in amplitude relative to the fundamental component, that the distortion and crossover errors illustrated in FIGS. 17 and 19 become almost undetectable. Indeed, the amplitudes of the third, fifth and seventh harmonics contained in the final voltage Ef are respectively reduced by factors of three, five, and seven in comparison to their amplitude relation to the fundamental frequency component in the voltage Eo. Thus, the use of an integrator 64 avoids the harmonic distortion errors.

It should be noted that the integrator 64 has here been shown as receiving the output voltage Eo produced by the resolver 40 excited with a single phase A.C. voltage in combination with a phase converting circuit 61. However, the advantages of the integrator operating to transform a phase-variable voltage produced by a polyphase excited resolver, without the use of a phase converting circuit, are equally desirable, and this is intended to be within the scope of the present invention.

It will be understood that the integrator 64 produces a 90° phase lead between the fundamental component of its input signal Eo and its output signal Ef. However, this phase shift is a substantially constant value even though the fundamental frequency varies by ±10% or more. This substantially constant phase shift can be compensated for by adjustment of the mechanical phase with which the resolver rotor 40b is geared to the lead screw 24 (FIG. 1), or can be compensated for by a manually adjustable differential resolver interposed between the amplifier 59 and the feedback resolver 40. The use of such a manually adjustable differential resolver to introduce an adjustable and compensating phase offset is well known, per se, and need not be illustrated or described in detail.

It has been found that further filtering or smoothing of the final voltage Ef promotes still further purity of the sinusoidal waveform of the final voltage and results in even more precise operation of a phase discriminator which receives that voltage. Thus, the particular integrator 64 shown by way of example in FIG. 3 has been constructed to include a simple smoothing filter circuit 219 comprising a series resistor 220 and a shunt capacitor 221 interposed between the integrating amplifier output terminal 204 and the input to the cathode follower 64a. From experience, it has been found that the time constant of this R-C filter, (or any filter similar in operation to it) should preferably be in the range such that $R\text{-}C\omega=1$ to 4, where R and C are the values of the resistor 220 and capacitor 221, and where $\omega$ is $2\pi$ times the normal frequency of operation.

The R-C filter 219 operates to shunt off and remove any high frequency distortion components which appear in the output of the integrating amplifier 204. Thus it serves to further remove from the final voltage Ef any noise spikes or higher harmonic distortion components which may pass through the integrating amplifier. The R-C filter circuit is frequency-phase sensitive, i.e., its output voltage will shift slightly in phase relative to its input voltage as the frequency of the input voltage changes. However, it has been found that this variable phase shift introduced by a smoothing R-C filter is not so great as to be objectionable. More importantly, however, it has been found that the phase error introduced by the R-C filter circuit varies substantially linearly with departures in the frequency of the input voltage from the design value over a range of ±10%. This linear frequency-phase variation is not detrimental to the entire servo system because it adds to the "velocity lag" of the servo system and thus serves to help increase the speed of the motor 22 as the phase error becomes greater and greater. Thus, while a simple integrator or integrating amplifier to transform the output voltage Eo into a final voltage Ef greatly improves the operation of the present apparatus, that operation can be further enhanced by the use of a smoothing filter connected in tandem with the integrator.

I claim:

1. A phase-sensitive servo control system comprising means for generating two recurring pulse streams which relatively shift in phase according to the desired value of a controllable quantity, means for converting one of said streams into a clipped square waveform, a third harmonic rejection filter connected to receive said square waveform, a band pass filter connected to receive the output of said rejection filter and having its pass band centered susbtantially at the nominal frequency of said one stream, the output of said band pass filter being a sinusoidal excitation signal having a fixed phase relation to said one stream, a synchronous induction device having a rotor and means for moving the rotor through an angle $\theta$ corresponding to the actual value of said controllable quantity, means connecting said sinusoidal excitation signal to said induction device to create a pulsating magnetic field therein; said induction device including means for producing two alternating voltages respectively proportional in amplitude to, and agreeable in phase polarity with the signs of, sin $\theta$ and cos $\theta$; means including a series-resonant L-C circuit for converting one of said two voltages into a first auxiliary voltage proportional in amplitude to, but shifted 90° in phase from, such one voltage; means including a non-reactive voltage divider for converting the other of said two voltages into a second auxiliary voltage proportional in amplitude to, and in phase with, such other voltage; means for vectorially adding said first and second auxiliary voltages to derive an output voltage of substantially constant amplitude and shifted in phase by an angle $\theta$; phase discriminator means for creating a control signal corresponding to the phase mismatch of the other of said pulse streams relative to said output voltage; and means responsive to said control signal for correspondingly changing said controllable quantity.

2. A phase-sensitive servo control system comprising means for generating two recurring pulse streams which relatively shift in phase according to the desired value of a controllable quantity; means for converting one of said streams into a clipped square waveform, a third harmonic rejection filter connected to receive said square waveform, a band pass filter connected to receive the output of said rejection filter and having its pass band centered substantially at the nominal frequency of said one stream, the output of said band pass filter being a sinusoidal excitation signal having a fixed phase relation to said one stream; a synchronous induction device having a movable part and means for moving said part to different positions $\theta$ corresponding to the actual value of said controllable quantity; means connecting said sinusoidal excitation signal to said induction device to create a pulsating magnetic field therein; said induction device including means for producing two alternating voltages respectively proportional in amplitude to, and agreeable in phase polarity with the signs of, sin $\theta$ and cos $\theta$; means including a center-tapped coil, a capacitor connected to the center tap thereof and series resonant with one half of said coil, means connecting one of said two voltages across one half of said coil and said capacitor so that a first auxiliary voltage appears across the other half of said coil and said capacitor, said first auxiliary voltage being porportional in amplitude to, but shifted 90° in phase from, such one voltage; means including a non-reactive voltage divider for converting the other of said two voltages into a second auxiliary voltage proportional in amplitude to, and in phase with, such other voltage; means for vectorially adding said first and second auxiliary voltages to derive an output voltage of substantially constant amplitude and shifted in phase by an angle $\theta$; phase discriminator means for creating a control signal corresponding to the phase mismatch of the other of said pulse streams relative to said output voltage; and means responsive to said control signal for correspondingly changing said controllable quantity.

3. A phase-sensitive servo control system comprising means for generating two non-sinusoidal recurring signals which relatively shift in phase acording to the desired value of a controllable quantity, means for converting one of said signals into a sinusoidal excitation signal having a fixed phase relation thereto; a synchronous induction device having a movable part and means for moving said part to different positions $\theta$ corresponding to the actual value of said controllable quantity; means connecting said sinusoidal excitation signal to said induction device to create a pulsating magnetic field therein; said induction device including means for producing two alternating voltages respectively proportional in amplitude to, and agreeable in phase polarity with the signs of, sin $\theta$ and cos $\theta$; means including a series-resonant L-C circuit for converting one of said two voltages into a first auxiliary voltage proportional in amplitude to, but shifted 90° in phase from, such one voltage; means including a non-reactive voltage divider for converting the other of said two voltages into a second auxiliary voltage proportional in amplitude to, and in phase with, such other voltage; means for vectorially adding said first and second auxiliary voltages to derive an output voltage of substantially constant amplitude and shifted in phase by an angle $\theta$; means for producing a final voltage which varies as the integral of said output voltage, phase discriminator means for creating a control signal corresponding to the phase mismatch of the other of said two recurring signals relative to said final voltage; and means responsive to said control signal for correspondingly changing said controllable quantity.

4. A phase-sensitive servo control system comprising means for generating two non-sinusoidal recurring signals which relatively shift in phase according to the desired value of a controllabe quantity; means for converting one of said signals into a sinusoidal excitation signal having a fixed phase relation thereto; a synchronous induction device having a rotor and means for moving the rotor through an angle $\theta$ corresponding to the actual value of said controllable quantity; means connecting said sinusoidal excitation signal to said induction device to create a pulsating magnetic field therein; said induction device including means for producing two alternating voltages respectively proportional in amplitude to, and agreeable in phase polarity with the signs of, sin $\theta$ and cos $\theta$; means including a series-resonant L-C circuit for converting one of said two voltages into a first auxiliary voltage proportional in ampitude to, but shifted 90° in phase from, such one voltage; means including first and second resistors in series for converting the other of said two voltages into a second auxiliary voltage across said first resistor proportional in amplitude to, and in phase with, such other voltage; a shielded cable for transmitting said other voltage to the series combination of said first and second resistors; a capacitor connected across said first resistor to neutralize stray capacity in said cable; means for vectorially adding said first and second auxiliary voltages to derive an output voltage of substantially constant amplitude and shifted in phase by an angle $\theta$; phase discriminator means for creating a control signal corresponding to the phase mismatch of the other of said recurring signals relative to said output voltage; and means responsive to said control signal for correspondingly changing said controllable quantity.

5. In a phase control system for producing an output voltage which changes in phase relative to a recurring pulse wave according to a variable physical quantity, the combination comprising means for converting said recurring pulse wave into a square wave voltage, means for clipping said square wave voltage to an adjustable amplitude level, a third harmonic rejection filter connected to the output of said clipping means, a narrow band-pass filter connected to the output of said rejection filter, a wave-shaping amplifier connected to receive the output of said band-pass filter and to produce a sinusoidal excitation voltage matched in frequency and fixed in phase relative to said recurring pulse wave, a negative feed-back connection from the output of said amplifier to said regulated clipping means to inversely change the amplitude level of the output of said clipping means in response to changes in the amplitude of said excitation voltage, a synchronous induction device having two relatively movable parts and means for displacing the same in accordance with said variable physical quantity, said induction device having an input winding connected to receive said excitation voltage to produce a pulsating magnetic field and having two output windings producing two sinusoidal A.C. voltages respectively proportional in amplitude to and agreeable in phase polarity with the sine and cosine of said variable physical quantity; a series circuit comprising a resistor, inductive reactance, and capacitive reactance connected to receive one of said A.C. voltages; said inductive and capacitive reactances being tuned to series resonance at the frequency of said A.C. voltages when said parts are stationary; a series circuit comprising first and second resistors connected to receive the other of said A.C. voltages; means for vectorially adding the voltages across said first resistor and one of said reactive elements to produce an output voltage; and means for integrating said output voltage to produce a final voltage substantially constant in amplitude and variable in phase according to variations in said physical quantity.

6. In apparatus for converting a square wave reference voltage having a predetermined frequency into a recurring wave shifted in phase relative to said reference voltage according to a physical variable, the combination comprising means for clipping said reference voltage to convert it into a square wave voltage of constant amplitude, means for filtering said constant-amplitude voltage to attenuate the third harmonic component therefrom, a band pass filter connected to receive the output of said last-named means and to pass signal components within a narrow band centered approximately about said predetermined frequency, a synchronous induction device having a stator and a rotor, means for moving the rotor in accordance with said physical variable, said device having a stator winding excited with the output from said band pass filter to produce a pulsating magnetic field therein, said device having two rotor windings physically spaced by 90° and with first and second alternating voltages induced therein, means for converting said first alternating voltage into a first auxiliary voltage shifted in phase by 90° therefrom, means for converting said second alternating voltage into a second auxiliary voltage in phase therewith, said last-named means including means for making the maximum amplitudes of said first and second voltages substantially equal, means for vectorially adding said first and second auxiliary voltages to produce a sinusoidal output voltage, and means for integrating said output voltage to derive a final voltage which is substantially independent in amplitude of the velocity of said rotor, and free of waveform distortions in said output voltage.

7. For use in a phase-sensitive servo system having a variable quantity, the combination comprising a synchronous induction resolver having a stator, a rotor, an exciting winding, and two output windings physically separated by 90°, means for turning said rotor to angular positions $\theta$ according to the value of said variable quantity, said output windings producing two alternating signals respectively proportional in amplitudes to and agreeable in phase polarities with sine $\theta$ and cosine $\theta$, a center-tapped inductance, a capacitor, a first resistor, means connecting said first resistor, a first half of said inductance, and said capacitor in series to form a series resonant circuit adapted to be energized by one of said alternating signals, second and third resistors connected in series and adapted to be energized by the other of said alternating signals, means connecting the other half of said inductance, said capacitor and said second resistor in series between two output terminals thereby to produce at said output terminals an output signal at a phase angle $\theta$; means for making substantially equal the attenuation factors relating (a) the amplitude of the signal across said second resistor to the amplitude of said other signal and (b) the amplitude of the signal across said capacitor and second half of the inductance to the amplitude of said one signal; and integrating circuit means connected to receive said output signal for producing a final signal of substantially constant amplitude and at a phase angle which varies directly with $\theta$.

8. The combination comprising a synchronous resolver having a stator and a rotor, a stator winding and means to energize the same with a sinusoidal alternating exciting voltage to produce a pulsating magnetic field, said resolver having two rotor windings physically spaced by 90°, means for deriving from the voltage induced in one of said rotor windings a first auxiliary voltage shifted 90° in phase therefrom, means for deriving from the voltage induced in the other of said rotor windings a second auxiliary voltage in phase therewith, means for vectorially adding said first and second auxiliary voltages to produce an output voltage shifted in phase relative to said exciting voltage according to the relative angle of stator and rotor, and means including an intergrating amplifier and an R-C low pass filter connected in tandem to convert said output voltage into a final signal varying substantially as the time integral thereof and substantially free of higher frequency distortions therein, whereby said final signal is in amplitude substantially independent of the speed of rotation of said rotor and relatively undistorted by higher frequency noise appearing in said output voltage.

9. In a control system having means for producing two alternating voltages which respectively vary in amplitude and phase polarity according to sine $\theta$ and cosine $\theta$, where $\theta$ is a physical variable, the combination comprising two pairs of conductors for respectively transmitting said two alternating voltages to a remote location, a grounded conductive sheath surrounding said two pairs of conductors to shield the same, a series resonant circuit connected across one pair of said conductors at said remote location and including inductive and capacitive reactances tuned to resonance, first and second resistors connected in series across the other pair of said conductors at said remote location, first and second output terminals and means connecting the same to receive therebetween the vector sum of the voltages appearing across one of said reactances and said first resistor, one of said output terminals being connected to said first resistor and to ground, and means connected with the series circuit formed by said first and second resistors for neutralizing stray capacitance between said conductors and sheath so that the voltage across said first resistance is in phase with the said alternating voltage applied to said other pair of conductors.

10. In a control system, the combination comprising a resolver and means to excite the same with a pulsating magnetic field; said resolver having a rotor movable through an angle $\theta$ and having two output windings producing two alternating voltages respectively proportional in amplitude to, and agreeable in phase polarity with, sine $\theta$ and cosine $\theta$; four conductors leading respectively from the four terminals at the extremities of said two output windings; a grounded shield surrounding said four conductors; a series resonant circuit including an inductance element and a capacitance element connected in series across those two of said four conductors which lead from one of said windings; first and second resistors connected in series across the remaining two of said conductors leading from the other of said windings; two output terminals and means to impress thereacross the vector sum of the voltages appearing respectively across said first resistor and one of said elements; and a capacitor connected in parallel with said first resistor to cancel phase shifts otherwise created by stray capacity between said conductors and said shield.

11. For use in a phase control system having a variable quantity $\theta$, the combination comprising means for producing two alternating voltages respectively proportional in amplitude to, and agreeable in phase polarity with, the signs of cosine $\theta$ and sine $\theta$, a center-tapped coil, a capacitor, means connecting the first half of said coil and said capacitor in series to form a series resonant circuit, first and second resistors connected in series combination, relatively long conductors for applying one of said alternating voltages to said series resonant circuit and the other of said voltages to said series combination, a grounded conductive sheath surrounding said conductors for shielding the same, two output terminals and means connecting said first resistor, said capacitor and the other half of said coil in series therebetween, that one of said output terminals leading from said first resistor being connected to ground, and a capacitor connected in parallel with said first resistor to obviate phase shifts otherwise caused by stray capacitance between said conductors and said sheath.

12. In combination, a synchronous induction device having first and second winding means movable relative to one another, means for exciting said first winding means with sinusoidal alternating voltage to produce a changing magnetic field which inductively couples with said second winding means, thus inducing sinusoidal alternating voltage in the latter, an integrator, means connected to receive said induced alternating voltage for coupling from said second winding means to said integrator an output sinusoidal alternating voltage which shifts in phase according to the relative positions of said two winding means and which is of substantially constant amplitude when said first and second winding means are not moving relative to one another but which is variable in amplitude in response to varying relative velocities of motion between said two winding means, said integrator constituting means for producing a final sinusoidal alternating voltage which is substantially unaffected by variations in amplitude due to said relative motion.

13. The combination set forth in claim 12, further characterized by a smoothing filter connected to receive the output voltage produced by said integrator for producing a final alternating signal having lesser high frequency distortion components.

14. In combination, a synchronous induction device having a stator part and a rotor part, first and second winding means each mounted on one of said parts and rotatable relative to one another, means for exciting said first winding means with sinusoidal alternating voltage to produce a changing magnetic field which inductively couples with said second winding means thus inducing a sinusoidal alternating voltage in the latter, an integrator, means connected to receive said induced alternating voltage for coupling from said second winding means to said integrator a sinusoidal alternating output voltage which shifts in phase according to the relative angular positions of said two parts and which is of substantially constant amplitude when said parts are not rotating relative to one another but which varies in amplitude in response to varying relative rotational velocities between said parts, said output voltage thus exhibiting the properties of a voltage induced in a single winding rotatable relative to a single synchronously rotating magnetic field and being instantaneously proportional to the rate of change of flux linkage by said rotating field with said single winding, said integrator constituting means for producing a final sinusoidal voltage which exhibits the properties of a voltage instantaneously proportional to flux linkage of a single synchronously rotating magnetic field with a single winding rotatable relative thereto, said final voltage thus being substantially unaffected in amplitude by said varying relative rotational velocities.

15. The combination comprising a synchronous resolver having a stator part and a rotor part rotatable relative to one another, a first winding mounted on one of said parts, second and third windings mounted on the other of said parts and physically spaced by 90°, means for exciting said first winding with a first sinusoidal alternating voltage to produce in effect two counter-rotating magnetic fields of equal, uniform strength which inductively couple with said second and third windings to induce therein second and third sinusoidal alternating voltages which are instantaneously proportional to the rates of change of flux linking those respective windings, means for shifting said second voltage by 90° in phase to produce a fourth alternating voltage, means for vectorially adding said third and fourth voltages to produce an output alternating voltage shifted in phase relative to said first voltage according to the relative angular positions of the stator part and rotor part, said output voltage being of substantially constant amplitude when said stator and rotor parts are not rotating relative to one another but varying in amplitude in response to variations in the velocity of relative rotation of such parts, and integrating means connected to receive said output voltage for producing a final alternating voltage which is substantially unaffected by variations in amplitude due to said relative rotation.

References Cited by the Examiner
UNITED STATES PATENTS

| | | | |
|---|---|---|---|
| 2,537,770 | 1/51 | Livingston et al. | 318—162 |
| 2,791,744 | 5/57 | Carney | 323—109 |
| 2,874,352 | 2/59 | Durbin | 323—109 |
| 2,880,391 | 3/59 | Norton | 323—109 |
| 2,922,991 | 1/60 | Frank | 318—28 |
| 2,937,325 | 5/60 | Garber | 318—28 |
| 2,946,004 | 7/60 | Frank | 324—83 |
| 2,970,302 | 1/61 | Gridley | 318—28 |
| 3,011,110 | 11/61 | Yu-Chi et al. | 318—28 |
| 3,056,921 | 10/62 | Flarity | 323—110 |
| 3,068,407 | 12/62 | Altman | 324—83 |
| 3,078,400 | 2/63 | Kilroy et al. | 318—28 |

JOHN F. COUCH, *Primary Examiner.*